United States Patent
Hicks et al.

(10) Patent No.: US 12,147,905 B2
(45) Date of Patent: Nov. 19, 2024

(54) DIGITAL TRANSACTION LEDGER WITH DNA-RELATED LEDGER PARAMETER

(71) Applicant: INTERNATIONAL BUSINESS MACHINES CORPORATION, Armonk, NY (US)

(72) Inventors: Andrew C. M. Hicks, Highland, NY (US); Ronald David Boenig, II, Denver, CO (US); Atul Kumar Thapliyal, New Delhi (IN); Scott Woolley, Poughkeepsie, NY (US); Daniel John FitzGerald, Danbury, CT (US); Travis Biro, Cold Spring, NY (US)

(73) Assignee: INTERNATIONAL BUSINESS MACHINES CORPORATION, Amork, NY (US)

( * ) Notice: Subject to any disclaimer, the term of this patent is extended or adjusted under 35 U.S.C. 154(b) by 454 days.

(21) Appl. No.: 17/308,267

(22) Filed: May 5, 2021

(65) Prior Publication Data

US 2022/0358371 A1  Nov. 10, 2022

(51) Int. Cl.
*G06N 3/123* (2023.01)
*G06F 16/23* (2019.01)

(52) U.S. Cl.
CPC ......... *G06N 3/123* (2013.01); *G06F 16/2315* (2019.01)

(58) Field of Classification Search
CPC .............................. G06F 16/2315; G06N 3/123
See application file for complete search history.

(56) References Cited

U.S. PATENT DOCUMENTS

| 9,985,964 | B2 | 5/2018 | Andrade |
| 10,666,423 | B2 | 5/2020 | Benini |
| 2021/0058254 | A1* | 2/2021 | Polcha .................. H04L 9/0637 |

OTHER PUBLICATIONS

Yixin Zhang ("Blockchain of Signature Material Combining Cryptographic Hash Function and DNA Steganography," B Cube, Center for Molecular Bioengineering, Technische Universitat Dresden, https://arxiv.org/ftp/arxiv/papers/1909/1909.07914.pdf, 2019, pp. 1-12) (Year: 2019).*

Ethash ("Ethash", edited by James Ray, https://github.com/ethereum/wiki/wiki/Ethash, www.archive.org, May 1, 2019, pp. 1-25) (Year: 2019).*

Mathur, Garima, Anjana Pandey, and Sachin Goyal. "Immutable DNA sequence data transmission for next generation bioinformatics using blockchain technology." 2nd International Conference on Data, Engineering and Applications (IDEA). IEEE, 2020. (Year: 2020).*

(Continued)

*Primary Examiner* — Kevin W Figueroa
(74) *Attorney, Agent, or Firm* — Teddi Maranzano, Esq.; Kevin P. Radigan, Esq.; Heslin Rothenberg Farley & Mesiti P.C.

(57) ABSTRACT

A digital transaction ledger with a DNA-related parameter is provided by obtaining DNA-based data unique to a particular entity, and establishing a DNA-related ledger parameter using the DNA-based data. Further, the method includes associating the DNA-based ledger parameter with a digital transaction ledger, making the digital transaction ledger related, at least in part, to the obtained DNA-based data.

17 Claims, 16 Drawing Sheets

(56) References Cited

OTHER PUBLICATIONS

Mansouri, Deloula, Xiaohui Yuan, and Abdeldjalil Saidani. "A new lossless DNA compression algorithm based on a single-block encoding scheme." Algorithms 13.4 (2020): 99. (Year: 2020).*

Choi, Jenn M., "How Blockchain Could Make Life & Death Easier for Families", published May 23, 2018, at: https://hackernoon.com/how-blockchain-could-make-life-death-easier-for-families-9c14ca4e3415 (10 pages) (Year: 2018).

Cinelli, Mattia, "Hidden Markov Model for Biological Sequence", published Dec. 13, 2020 at: https://towardsdatascience.com/hidden-markov-model-applied-to-biological-sequence-373d2b5a24c (1 page) (Year: 2020).

Coingeek, "Japan's Zweispace to Automate Wills with Smart Inheritance Contracts", published Online Jan. 16, 2020 at: https://coingeek.com/japans-zweispace-to-automate-wills-with-smart-inheritance-contracts/ (2 pages) (Year: 2020).

Crawford, Bridget J., "Blockchain Wills", Indiana Law Journal, vol. 95, Issue 3, Article 3 (55 pages) (Year: 2020).

El-Edkawy, et al., "DNA Based Network Model and Blockchain", Mansoura University, Egypt, arXiv preprint arXiv:1908.07829 (5 pages) (Year: 2019).

Hempel, Jessi, "How Refugees Are Helping Create Blockchain's Brand New World", Wired, published Mar. 14, 2018, at: https://www.wired.com/story/refugees-but-on-the-blockchain/ (6 pages) (Year: 2018).

Mel et al., "The NIST Definition of Cloud Computing," National Institute of Standards and Technology, Information Technology Laboratory, Special Publication 800-145, 7 pages, Sep. 2011 (Year: 2011).

Stourton, Natasha, "Crypto-Wills: Can Self-Adminitering Estates Do Away with Executors?", published Oct. 16, 2018, at: https://www.withersworldwide.com/en-gb/insight/crypto-wills-can-self-administering-estates-do-away-with-executors (3 pages) (Year: 2018).

Sverdlov Law, "Regular Wills vs. Crypto Wills", Katya Sverdov Blog, published Dec. 4, 2018, at: https://sverdlovlaw.com/lawyer/2018/12/04/Estate-Planning/Regular-Wills-vs.-Crypto-Wills_bl36253.htm (1 page) (Year: 2018).

Xu et al., "Biometric Blockchain: A Better Solution for the SEcurity and Trust of Food Logistics", Materials Science and Engineering, vol. 646, No. 1, 7 pages (Year: 2019).

* cited by examiner

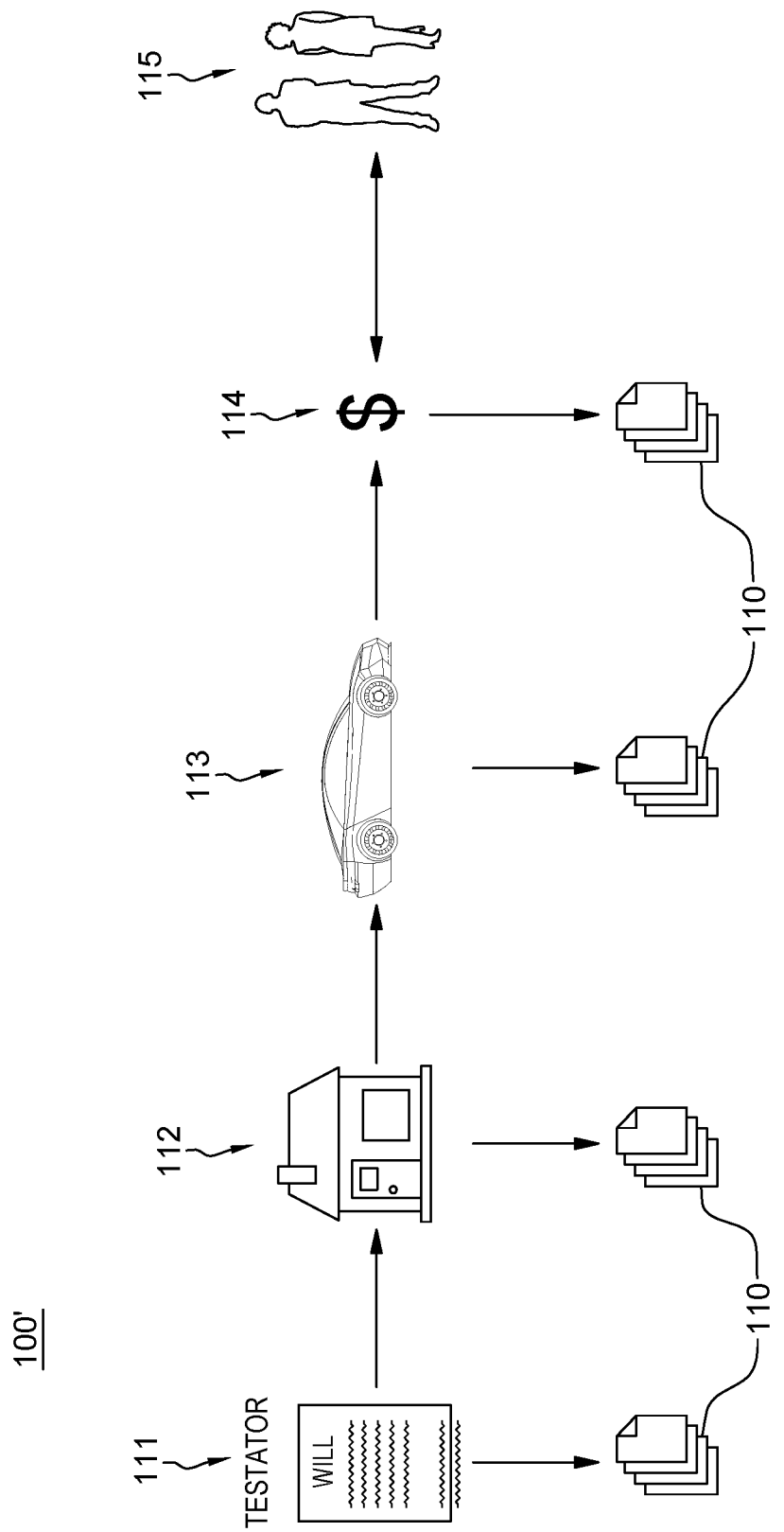

- WHERE ESTABLISHING THE DNA-RELATED LEDGER PARAMETER INCLUDES EXPANDING THE DNA-BASED DATA TO A SPECIFIED BIT LENGTH FOR THE DNA-RELATED LEDGER PARAMETER TO FACILITATE ASSOCIATING THE DNA-RELATED LEDGER PARAMETER WITH THE DIGITAL TRANSACTION LEDGER ~912

- WHERE THE EXPANDING INCLUDES ASCERTAINING A PRIME NUMBER IN THE INTEGER STRING, AND APPLYING THE ASCERTAINED PRIME NUMBER TO THE INTEGER STRING TO OBTAIN THE DNA-RELATED LEDGER PARAMETER OF THE SPECIFIED BIT LENGTH ~914

- WHERE APPLYING THE PRIME NUMBER INCLUDES RECURSIVELY MULTIPLYING THE INTEGER STRING BY THE ASCERTAINED PRIME NUMBER UNTIL REACHING THE SPECIFIED BIT LENGTH FOR THE DNA-RELATED LEDGER PARAMETER ~916

- WHERE THE ASSOCIATING INCLUDES USING THE DNA-RELATED LEDGER PARAMETER AS A ROOT KEY FOR THE DIGITAL TRANSACTION LEDGER, THEREBY MAKING THE DIGITAL TRANSACTION LEDGER RELATED, AT LEAST IN PART, TO THE OBTAINED DNA-BASED DATA ~918

- WHERE THE ASSOCIATING INCLUDES INCLUDING THE DNA-RELATED LEDGER PARAMETER WITH A TRANSACTION RECORD OF THE DIGITAL TRANSACTION LEDGER, THEREBY MAKING THE DIGITAL TRANSACTION LEDGER RELATED, AT LEAST IN PART, TO THE OBTAINED DNA-BASED DATA ~920

- WHERE THE ASSOCIATING SYNCS TRANSACTION RECORDS OF THE DIGITAL TRANSACTION LEDGER TO THE DNA-RELATED LEDGER PARAMETER, THEREBY RELATING THE TRANSACTION RECORDS OF THE DIGITAL TRANSACTION LEDGER TO THE OBTAINED DNA-BASED DATA ~924

- OBTAIN OTHER DNA-BASED DATA FROM A DNA SAMPLE ~928

EXTRACT THE DNA-RELATED LEDGER PARAMETER FROM THE DIGITAL TRANSACTION LEDGER ~930

USE THE OTHER DNA-BASED DATA AND THE EXTRACTED DNA-RELATED LEDGER PARAMETER IN VERIFYING WHETHER THERE IS A DNA RELATIONSHIP ABOVE A SET THRESHOLD BETWEEN THE OTHER DNA-BASED DATA AND THE EXTRACTED DNA-RELATED LEDGER PARAMETER ~932

INITIATE AN ACTION BASED ON RESULTS OF VERIFYING WHETHER THERE IS A DNA RELATIONSHIP ABOVE THE SET THRESHOLD ~934

DIGITAL TRANSACTION LEDGER WITH DNA-RELATED LEDGER PARAMETER

BACKGROUND

Digital transaction ledger technology, such as blockchain technology, can involve a combination of technologies, including (for instance) cryptographic keys, peer-to-peer networks containing a shared ledger, and computing resources to store transactions and records of the network. By way of example, a blockchain is a publicly available and publicly maintained distributed ledger, roughly equivalent to a database, where verifiable transactions are permanently recorded, and designed in such a way that data in a given block cannot be retroactively altered without altering sequential blocks.

A blockchain is managed by a peer-to-peer (P2P) network of nodes that validate new blocks using a consensus algorithm. The consensus algorithm ensures that the next block in a blockchain is the one and only version of the genuine one, thus preventing any branching from the chain. As a result, all nodes of the network contain the same replica of data, eliminating the need for a central trusted authority to manage data.

Digital transaction ledger technology is an emerging field with potential to disrupt traditional processes in various businesses and industries.

SUMMARY

Certain shortcomings of the prior art are overcome and additional advantages are provided through the provision, in one or more aspects, of a computer-implemented method, which includes obtaining DNA-based data unique to a particular entity, and establishing a DNA-related ledger parameter using the DNA-based data. The computer-implemented method further includes associating the DNA-related ledger parameter with a digital transaction ledger, making the digital transaction ledger related, at least in part, to the obtained DNA-based data. Advantageously, making the digital transaction ledger related, at least in part, to the obtained DNA-based data enhances digital transaction ledger technology by linking DNA-based encoding to the digital transaction ledger. Linking a DNA profile to the digital transaction ledger advantageously provides immutable proof of identity, and can be used to execute one or more DNA-related transactions along the digital transaction ledger. In this manner, authenticity is guaranteed through the ledger and the associated DNA encoding. In one or more implementations, the DNA encoding is used as a unique key in the digital transaction ledger, and is a personalized key to a particular entity for use in the transaction ledger.

In one embodiment, obtaining the DNA-based data includes receiving a DNA sample unique to the particular entity, and extracting a nucleotide chain section from the DNA sample unique to the particular entity. Further, the obtaining includes providing, at least in part, the DNA-based data using the nucleotide chain section. By providing the DNA-based data using a nucleotide chain section unique to a particular entity, the DNA-related ledger parameter established from the DNA-based data is tied to the particular entity's DNA, thereby establishing a unique identifier correlated to a specific DNA nucleotide chain.

In one implementation, providing the DNA-based data using the nucleotide chain section includes splitting the nucleotide chain section into multiple nucleotide sections or sequences, and using a numeral system to convert the multiple nucleotide sequences into an integer string to provide the DNA-based data and facilitate establishing the DNA-related ledger parameter. Advantageously, the integer string is established unique to the nucleotide chain section.

In one embodiment, establishing the DNA-related ledger parameter includes expanding the DNA-based data to a specified bit length for the DNA-related ledger parameter to facilitate associating the DNA-related ledger parameter with the digital transaction ledger. For instance, in one embodiment, 256 or 512 encoding can be used, with the DNA-related ledger parameter being a hash parameter or key of the desired bit length. In one embodiment, expanding the DNA-related data includes ascertaining a prime number in the integer string, and applying the ascertained prime number to the integer string to obtain the DNA-related ledger parameter of the specified bit length. For instance, in one embodiment, applying the prime number includes recursively multiplying the integer string by the ascertained prime number until reaching the specified bit length for the DNA-related ledger parameter. In this manner, data within the integer string itself uniquely generated from the nucleotide chain is used to generate the more complex DNA-related ledger parameter of the desired bit size. Advantageously, a DNA-related ledger parameter is established for linking to the digital transaction ledger, which is related to the DNA-based data only, thereby tying (or linking) the digital transaction ledger to the DNA-based data.

In one or more embodiments, associating the DNA-related ledger parameter with the digital transaction ledger includes using the DNA-related ledger parameter as a root key for the digital transaction ledger, thereby making the digital transaction ledger related, at least in part, to the obtained DNA-based data. By using the DNA-related ledger parameter as root key for the digital transaction ledger, transaction records of the digital transaction ledger are advantageously synced or linked to the particular entity's DNA-based data.

In one or more embodiments, associating the DNA-related ledger parameter with the digital transaction ledger includes including the DNA-related ledger parameter with a transaction record of the digital transaction ledger, thereby making the digital transaction ledger related, at least in part, to the obtained DNA-based data. For instance, in one embodiment, the DNA-related digital parameter can be provided as metadata for a payload of a transaction record, thereby linking the digital transaction ledger, at least in part, to the DNA-related data.

In one embodiment, associating the DNA-related ledger parameter with the digital transaction ledger syncs transaction records of the digital transaction ledger to the DNA-related ledger parameter, thereby relating the transaction records of the digital transaction ledger to the obtained DNA-based data. Advantageously, by synching transaction records of the digital transaction ledger to the DNA-related ledger parameter, a genetic association is provided which can be traced forwards or backwards through the digital transaction ledger.

In one embodiment, the computer-implemented method further includes obtaining other DNA-based data from a DNA sample, and extracting the DNA-related ledger parameter from the digital transaction ledger. The other DNA-based data and the extracted DNA-related ledger parameter can then be used to verify whether there is a DNA relationship above a set threshold between the other DNA-based data and the extracted DNA-related ledger parameter. For instance, the DNA-based data and the extracted DNA-related ledger parameter can be used to determine whether the DNA is from the same entity, or whether the other DNA-based data is from an offspring of the particular entity whose DNA-based data was obtained and used in establishing the DNA-related ledger parameter that was extracted from the digital transaction ledger. The computer-implemented method further includes initiating an action based on results of verifying whether there is a DNA relationship above the set threshold. By linking DNA-based data encoding to the digital transaction ledger, immutable proof of an identity relation can be established from which an action can be taken, depending on the application. This allows for genetic-based verification in association with digital ledger technology, and the initiating of one or more actions based on the genetic-based verification.

In another aspect, a system is provided which includes a memory, one or more processors in communication with the memory, and program instructions executable by the one or more processors via the memory to perform a method. The method includes obtaining DNA-based data unique to a particular entity, and establishing a DNA-related ledger parameter using the DNA-based data. Further, the method includes associating the DNA-related ledger parameter with a digital transaction ledger, making the digital transaction ledger related, at least in part, to the obtained DNA-based data. Advantageously, making the digital transaction ledger related, at least in part, to the obtained DNA-based data enhances digital transaction ledger technology by linking DNA-based encoding to the digital transaction ledger. Linking a DNA profile to the digital transaction ledger advantageously provides immutable proof of identity, and can be used to execute one or more DNA-related transactions along the ledger.

In a further aspect, a computer program product is provided which includes a computer-readable storage medium having computer-readable code embodied therewith. The computer-readable code is executable by one or more processors to cause the one or more processor to obtain DNA-based data unique to a particular entity, and establish a DNA-related ledger parameter using the DNA-based data. Further, the computer program code is executable by the one or more processors to cause the one or more processors to associate the DNA-related ledger parameter with a digital transaction ledger, making the digital transaction ledger related, at least in part, to the obtained DNA-based data. Advantageously, making the digital transaction ledger related, at least in part, to the obtained DNA-based data enhances transaction ledger technology by linking DNA-based encoding to the ledger. Linking a DNA profile to the digital transaction ledger advantageously provides immutable proof of identity, and can be used to execute one or more DNA-related transactions along the ledger.

Additional features and advantages are realized through the techniques described herein. Other embodiments and aspects of the invention are described in detail herein and are considered a part of the claimed aspects.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 1B depicts one embodiment of a will, or estate chain, and documenting thereof in a digital transaction ledger, which can include a DNA-related ledger parameter in accordance with one or more aspects of the present invention;

FIGS. 9A-9B depict one embodiment of processing that illustrates various aspects of some embodiments of the present invention;

DETAILED DESCRIPTION

Figure 1A:
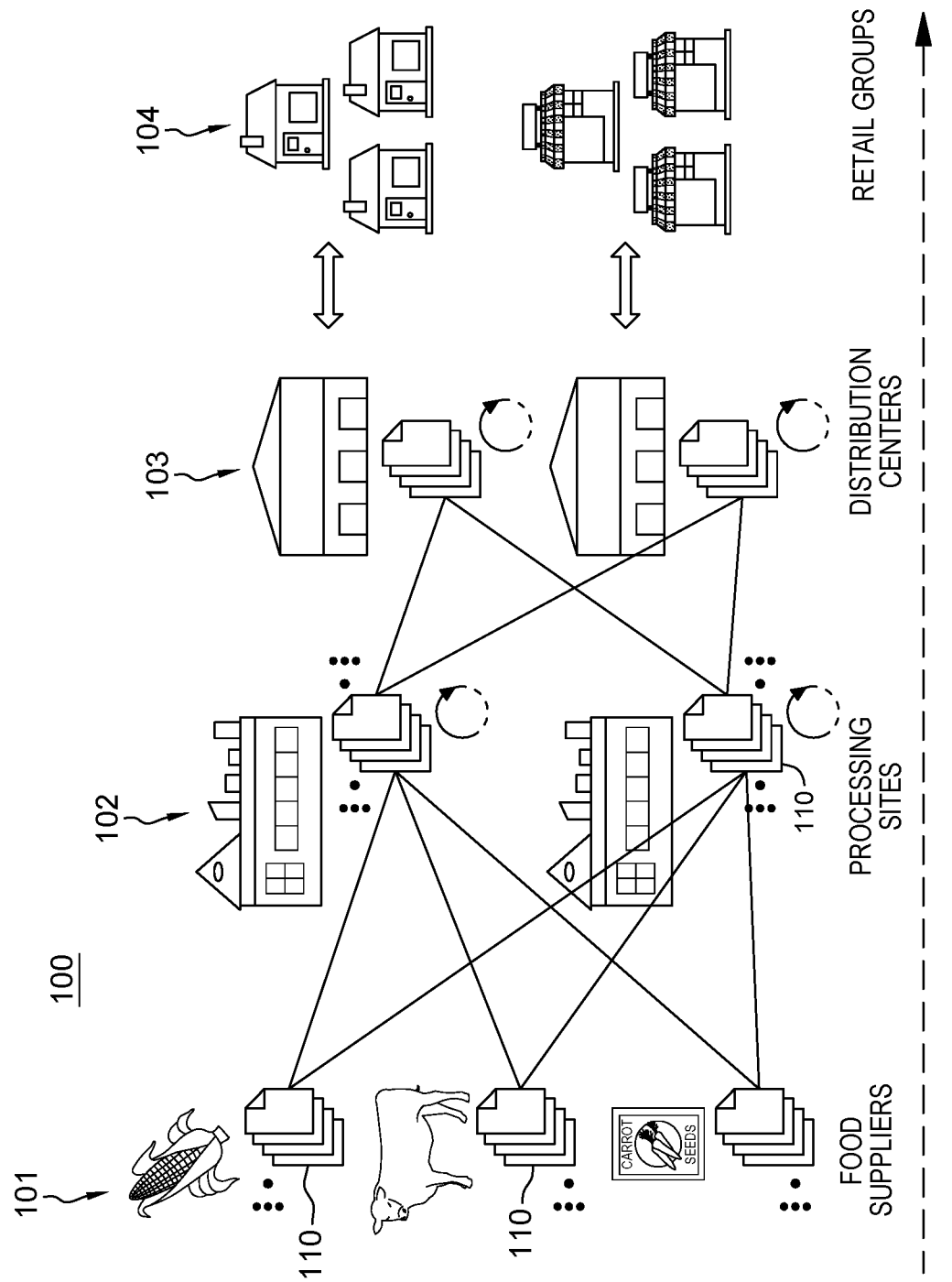
FIG. 1A depicts one embodiment of one or more food supply chains, and documenting thereof in one or more digital transaction ledgers, such as blockchains, which can include a DNA-related ledger parameter in accordance with one or more aspects of the present invention.

The accompanying figures, in which like reference numerals refer to identical or functionally similar elements through the separate views, and which are incorporated in and form a part of this specification, further illustrate the present invention and, together with the detailed description of the invention, serve to explain aspects of the present invention. Note in this regard that descriptions of well-known systems, devices, processing and sequencing techniques, etc., are omitted so as not to unnecessarily obscure the invention in detail. It should be understood, however, that the detailed description and the specific example(s), while indicating aspects of the invention, are given by way of illustration only, and not limitation. Various substitutions, modifications, additions, and/or other arrangements, within the spirit or scope of the underlying inventive concepts, will be apparent to those skilled in the art from this disclosure. Note further that numerous inventive aspects and features are disclosed herein, and unless inconsistent, each disclosed aspect or feature is combinable with any other disclosed aspect or feature as desired for a particular application of the concepts disclosed herein.

Note also that illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

Figure 3:
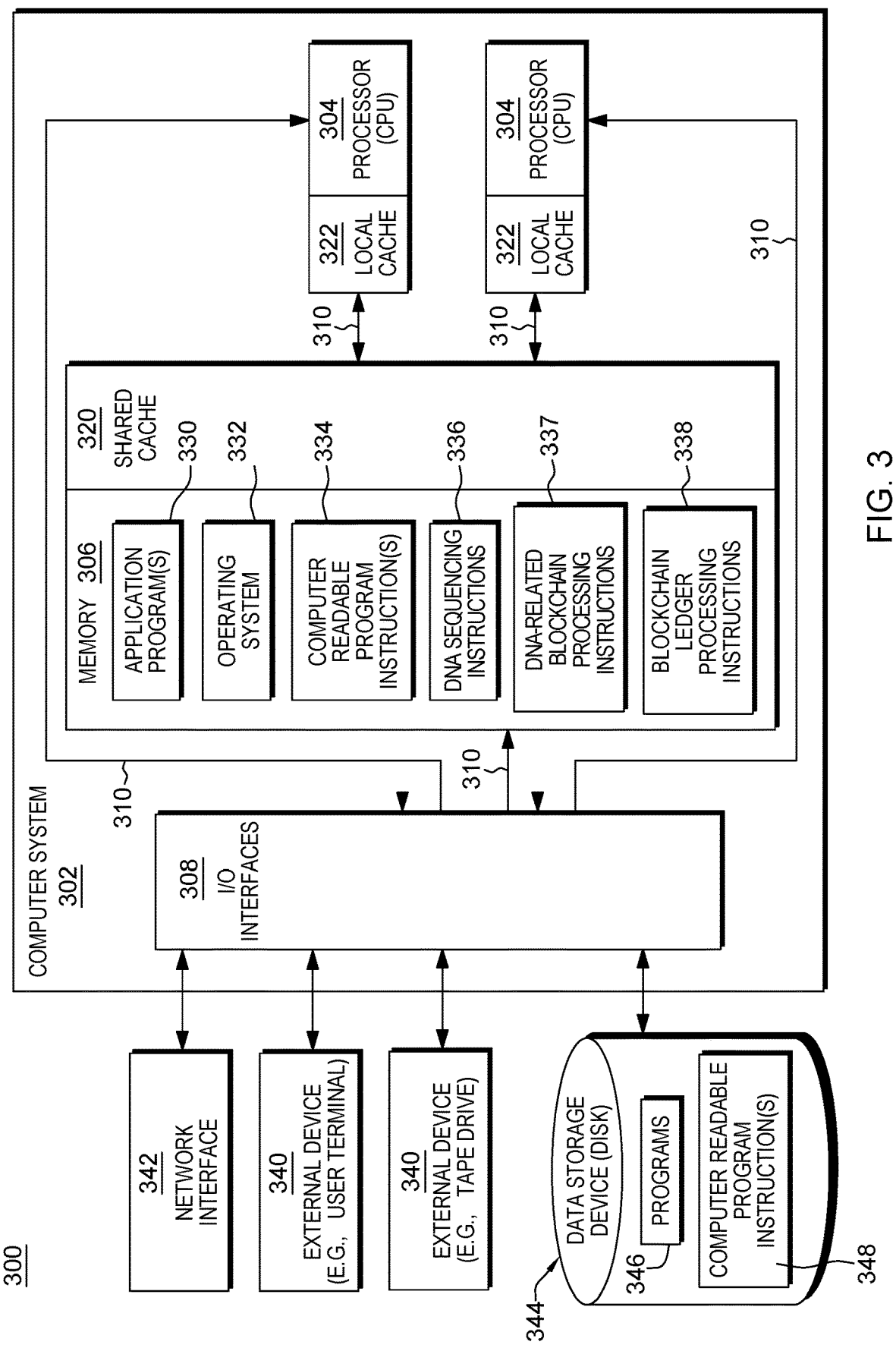
FIG. 3 depicts a block diagram of one embodiment of a computing node, or data processing system, to implement processing, in accordance with one or more aspects of the present invention.

As understood by one skilled in the art, program code, as referred to in this application, can include both software and hardware. For example, program code in certain embodiments of the present invention can include fixed function hardware, but other embodiments can utilize a software-based implementation of the functionality described. Certain embodiments combine both types of program code. One example of program code, also referred to as one or more programs or program instructions, is depicted in FIG. 3 as computer-readable program instructions 334, as well as application programs 330, DNA sequencing instructions 336, DNA-related blockchain processing instructions 337, and blockchain ledger processing instructions 338, one or more of which can be stored in memory 306 of computer system 302. Further examples include programs 346 and computer-readable program instruction(s) 348 in data storage device 344 of FIG. 3.

As noted, digital transaction ledger technology, such as blockchain technology, is an emerging field with the potential to disrupt traditional processes in various businesses and industries. While the transparency of digital transaction ledger technology is often advantageous, certain business applications can further benefit from additional technology enhancement. Disclosed herein is the integration of DNA-based encoding and digital ledger technology for various applications, such as the exemplary applications depicted in FIGS. 1A & 1B, by way of example.

Note that although described herein principally with reference to a blockchain record or blockchain-backed monitoring, the exemplary applications described can be assembled and protected using any desired digital transaction ledger technology including, for instance, blockchain, cryptographic ledger, digital ledger, distributed ledger, hyperledger, replicated journal technology (RJT), etc. Note also that as used herein, the phrase digital transaction ledger can include any of the above-noted transaction ledger technologies.

As illustrated in FIG. 1A, in the course of commerce, food products (vegetables, livestock, seeds, etc.) can pass from multiple source or supplier entities 101, to multiple processing entities 102, to multiple distribution entities 103, to an end-user or consumer who purchased, for instance, the product through one of multiple retail entities 104. The specific series of source, processing, transportation, distribution and retail entities involved with the product is commonly referred to as the supply chain 100 of the product. As product can change hands multiple times within its supply chain, and be incorporated into other products, etc., techniques to verify the quality and genuineness of the product can usefully be maintained along the supply chain. For instance, a buyer of a product along the supply chain can find it useful to verify properties such as, for instance, content, sourcing, provenance, regulation adherence, etc.

Recent developments in supply chain management have led to implementations of blockchain records 110 for supply chain integrity assurance. Blockchain is a distributed method of managing a single immutable ledger of verified transactions. A blockchain ledger (interchangeably referred to herein as a "blockchain") is decentralized, i.e., no single central authority is in control of the ledger entries or updates, rather, a network of authorized members share and verify the records, or blocks, that are to be added to the ledger. Once added, a block is immutable, i.e., cannot be changed or deleted, before a block is committed to the ledger, blockchain technology allows one or more verifications to be computed and applied to the block, and only upon a satisfactory number and/or types of verification can a block become a part of the ledger.

A block is uniquely identifiable in the ledger by an identifier associated with the block, where the block identifier is unique within the ledger. Unless a block is last in a branch in the ledger, each block is connected to a previous block and a next block. Therefore, the blockchain allows verification of the history of a transaction recorded in the particular block by providing access to the previous and next blocks as far as needed, up and down the ledger branches.

A variety of blockchain-based supply chain management solutions can be implemented to provide integrity management, such as using tags to avoid counterfeiting, utilizing sensed data and records of each point of transaction, billing contracts for various components, stock-keeping unit (SKU) stamps, similar product identifiers, material analysis, and/or other data to record transactions at different points in the supply chain, and their relevant sub-components.

Disclosed herein (in one embodiment) is a further blockchain-based supply management solution where DNA-based encoding is incorporated into the blockchain ledger to further reinforce the value chain. By associating DNA-based data with the blockchain ledger for a product, genetic associations can be traced forwards or backwards in a variety of applications such as, for instance, for confirming proprietary breeding rights in a line of livestock or, for instance, guaranteeing humane treatment in how livestock was raised by being able to link DNA of a particular food item back to, for instance, a particular livestock and supplier.

FIG. 1B illustrates another application where blockchain technology can be enhanced with DNA-related data. As noted, while blockchain technology is particularly advantageous for certain environments, it potentially lacks confidence in securing unidirectional transactions. An example of such a case is a will. As illustrated in FIG. 1B, a testator 111 can prepare a will with an associated blockchain ledger 110 for integrity assurance. At the time of drafting the will, and/or over time, multiple blockchain records can be added, adding various assets, such as a house 112, vehicle 113, money 114, etc., to the will, with direction for dispersing to one or more of the testator's offspring. In this situation, a unique DNA identifier can be encoded into the blockchain, such as a blockchain-based seed, using a compressed salt generated from the testator's DNA. For instance, the DNA-based parameter can be used as a unique root key in the blockchain, thereby linking all subsequent transactions to its identity. From there, Markov chain technology is used to continuously link/chain the data parameter or block into the blockchain, synching transactions to the testator's human DNA. This enables control of assets to pass through DNA encoding to the testator's offspring, with inheriting family members being able to unlock the chain using their DNA, claiming their right to their inheritance. Thus, with executing a will or estate using blockchain technology and DNA encoding such as described herein, the beneficiary's claims to assets can be proven by their unique DNA information.

This can advantageously eliminate the need for an intermediary to determine identities, asset values and to distribute assets. Rather, fractions of an inheritance or estate can be predetermined and executed via an electronic smart contract with DNA-based blockchain encoding as disclosed herein.

Figure 2:
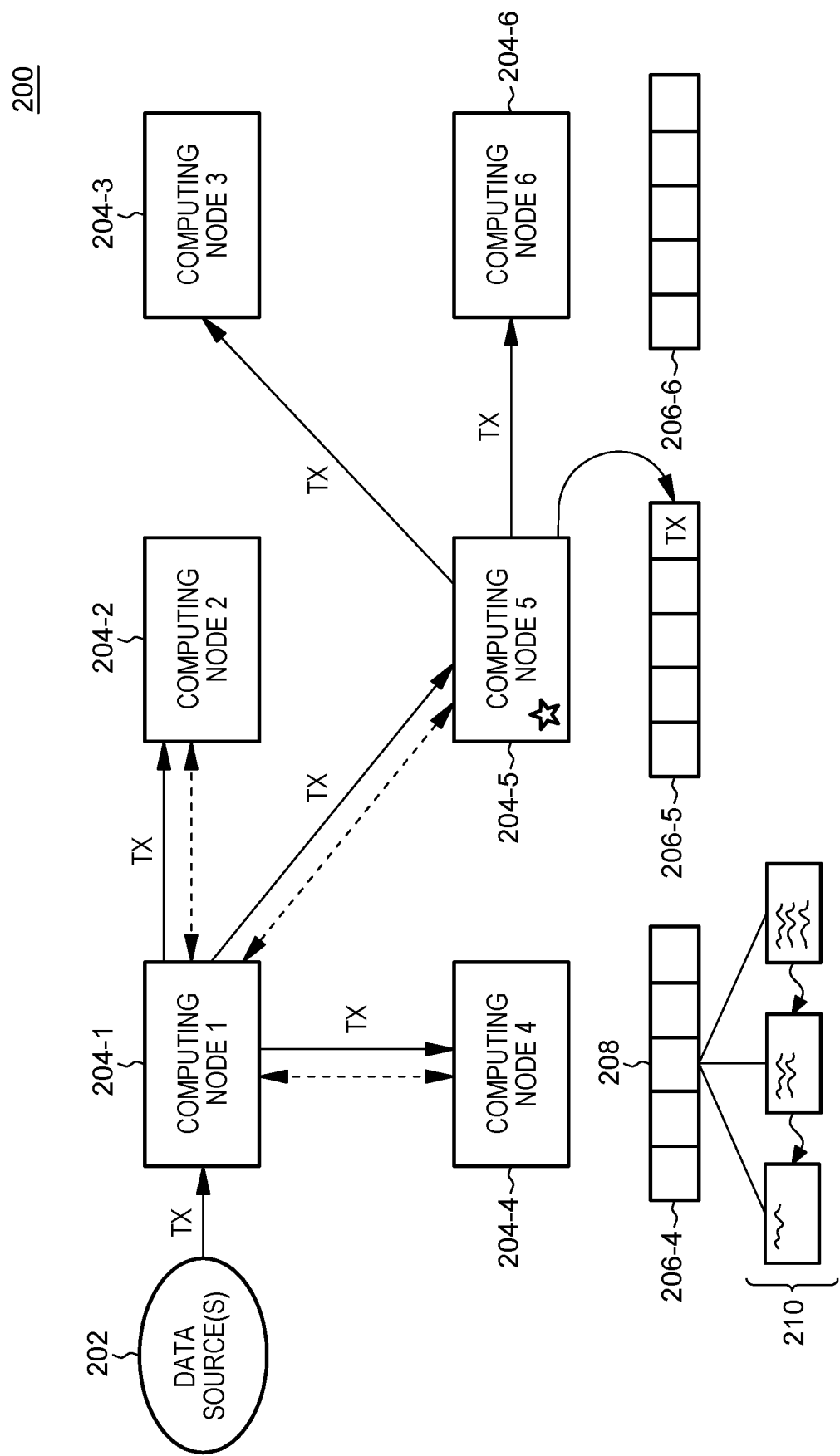
FIG. 2 depicts one embodiment of a system for computing a blockchain record for use in a blockchain ledger, in accordance with one or more aspects of the present invention.

FIG. 2 illustrates a blockchain computational system 200 with which one or more embodiments of the invention can be implemented. As shown, system 200 includes one or more data or transaction sources 202 operatively coupled to at least one of a plurality of distributed peer computing nodes 204-1, 204-2, . . . , 204-6. System 200 can have more or less computing nodes than illustrated in FIG. 2. Each computing node in system 200 can be a computing system or data processing system configured to maintain a blockchain, which as noted, is a cryptographically secured (via a cryptographic hash function) record or ledger of data blocks that represent respective transactions within the monitored environment. A cryptographic hash function is a cryptographic function which takes an input (or "message") and returns a fixed-size alphanumeric string, which is called the hash value (sometimes called a message digest, a digital fingerprint, a digest, or a checksum).

In FIG. 2, computing nodes 204-4, 204-5, and 204-6 are shown each maintaining the same blockchain (respectively illustrated as blockchains 206-4, 206-5, and 206-6). Although not expressly shown, each computing node in system 200 is configured to be able to maintain this same blockchain. Each blockchain is a growing list of data records hardened against tampering and revision (i.e., secure). Each block in the blockchain (illustratively referenced as block 208 in blockchain 206-4) holds batches of one or more individual transactions and the results of any blockchain executables (e.g., computations that can be applied to the transactions). Each block typically contains a timestamp and information linking it to a previous block. More particularly, each subsequent block in the blockchain (e.g., 206-4, 206-5, 206-6, etc.) is a data block that includes a given transaction and a hash value of the previous block in the chain (i.e., the previous transaction). The current transaction and the hash value of the prior transactions can itself be hashed to generate a hash value. Thus, each data block in the blockchain represents a given set of transaction data plus a set of all previous transaction data (e.g., as illustratively depicted as 210 in FIG. 2).

Assume a new set of transaction data (new transaction TX) is obtained from one of the one or more data sources 202, and received by computing node 1 (204-1). Computing node 1 (204-1) can provide the new transaction TX to all or a subset of computing nodes in system 200. In this case, transaction data TX is sent to computing node 2 (204-2), computing node 4 (204-4), and computing node 5 (204-5).

Note that computing node 204-5 is marked with a star symbol to denote it as a leader in a consensus protocol. That is, the computing nodes in the system 200 each are configured to participate in a consensus protocol as peers with one peer being designated as a leader. Any peer can assume the role of leader for a given iteration of the consensus protocol. In general, the leader receives all transactions from the participating peers in the system and creates a new block for the new transaction. The new block is sent out by the leader node to one or more of the other peer computing nodes (e.g., 204-3 and 204-6 as illustrated in FIG. 2) which double check (validate) that the leader computed the new block properly (i.e., the validating nodes agree by consensus). If consensus is reached, then the computing nodes in system 200 add the new block to the blockchain they currently maintain. As a result, after the new transaction TX is processed by the system 200, each computing node should now have a copy of the same updated blockchain stored in its memory. Then, when a new transaction comes into the system 200, the above-described process of adding the transaction to the blockchain is repeated.

It is to be understood that any single computing node can itself serve as the receiver, validator, and block generator for a new transaction data set. However, in the context of a consensus protocol, the more nodes that validate the given transaction, the more trustworthy the data block is considered.

It is to be further understood that the above description represents one illustrative blockchain computation process and that embodiments of the invention are not limited to the above or any particular blockchain computation implementation. As such, other appropriate cryptographic processes can be used to maintain and add to a secure chain of data blocks in accordance with embodiments of the invention. Further, although described herein with reference to a blockchain record or blockchain-backed monitoring, the record data documenting, for instance, a product's specific supply chain history, a will, etc., can be assembled and protected using any desired digital ledger technology, including blockchain, cryptographic ledger, digital ledger, distributed ledger, hyperledger, replicated journal technology (RJT), etc.

Advantages of a blockchain computational system include, but are not limited to: (1) the ability for independent nodes to converge on a consensus of a latest version of a large data set (e.g., a ledger), even when the nodes are run anonymously, have poor interconnectivity and may have operators who are dishonest or otherwise malicious; (2) the ability for any well-connected node to determine, with reasonable certainty, whether a transaction does or does not exists in the data set; (3) the ability for any node that creates a transaction to, after a confirmation period, determine with a reasonable level of certainty whether the transaction is valid, able to take place, and become final (i.e., that no conflicting transactions were confirmed into the blockchain elsewhere that would invalidate the transaction); (4) a prohibitively high cost to attempt to rewrite or otherwise alter transaction history; and (5) automated conflict resolution that ensures that conflicting transactions never become part of the confirmed data set.

Illustrative embodiments adapt the blockchain computational system 200 of FIG. 2 to monitor, manage and document data, such as associated with a product's supply chain or a will (as examples only). More particularly, in non-limiting, illustrative embodiments, blockchain technology can be applied to track and append data associated with a product's processing and distribution supply chain history as transactions in the blockchain in a secure manner. In one or more other illustrative embodiments, blockchain technology can be applied to track and append data associated with a testator's will as transactions in the blockchain in a secure manner. Blockchain technology can thus be used to securely maintain data as transactions (i.e., transaction data), which can be used as described herein to establish trust, accountability, and transparency, with regard to a product supply chain, will, other electronic document, etc.

Furthermore, as explained herein, illustrative embodiments provide a blockchain computational system for implementing the above and other management features wherein each computing node comprises controller modules for managing transaction data and blockchain computation. More particularly, one or more computing nodes in the system can be configured to track and detect product data, will data or other data, depending on the application.

As such, product or asset transactions associated with a given stakeholder (someone or something that is associated with the given environment) are compiled into a chain of transaction blocks. The chain can be considered a chronicle of the product's or document's path through time. When a transaction is conducted, the corresponding parameters are sent to one or more of the computing nodes in the system for validation. The one or more computing nodes establish a validity of the transaction and generate a new block. Once the new block has been calculated, it can be appended to the blockchain.

Aspects of one embodiment, or one or more features thereof discussed herein, can be configured as a modification of, or an enhancement to, a supply chain management system, with companion program code executing, for instance, in the supply chain management system itself, or a data processing system in communication with the supply chain management system. Data, such as transactions, can be provided by a variety of inputs, such as by sensors and other devices, that capture real-time data points along the supply chain. For instance, Internet of Things (IoT) enabled devices can be employed in various processing machines, food storage, transport devices or vehicles, or locations along the supply chain, to sense a variety of parameters such as, motion or lack thereof, changes in weight or humidity, elapsed time during a motion or lack thereof, force applied, distance traveled, speed or velocity, and many other data points of a processing or transport chain. Other types of embedded sensors can also be used to collect and transmit supply-chain-related data.

Further, in another embodiment, one or more features of an electronic will application, or other electronic document processing can be configured or enhanced with companion program code executing, for instance, in the data processing system creating or retaining the will. Data, such as transactions, can be provided by a variety of inputs monitoring, for instance, a testator's assets in the will example.

Note further that to the extent implementations of the present invention collect, store or employ confidential or personal information provided by, or obtained from, individuals, organizations, systems or other entities (including DNA information), such information is used in accordance with all applicable laws concerning protection of personal or confidential information. Additionally, the collection, storage and use of such information is, in one embodiment, subject to consent of the entity, or the entities, to the subject activity, for instance, through "opt-in" or "opt-out" processes, such as registration processes, as may be appropriate for the situation and type of information. Storage and use of personal information can be in any appropriate secure manner reflective of the type of information, for instance, through various encryption and anonymization techniques for particularly sensitive information.

Using a blockchain management system, an embodiment can construct a blockchain record from received data. In one or more embodiments discussed herein, the record data, or blockchain record, can be enhanced by DNA-based encoding of, for instance, a DNA-based blockchain parameter into the blockchain record, where the DNA-related blockchain parameter is related to DNA-based data unique to a particular entity to which the blockchain relates, such as a particular food entity in the case of a food supply chain, or a testator, in the case of a will. Other examples will be apparent for those skilled in the art based on the description provided herein.

FIG. 3 depicts one embodiment of a data processing environment, or computing node, in which one or more aspects of illustrative embodiments can be implemented. FIG. 3 is only an example and is not intended to assert or imply any limitation with regard to the environments in which different aspects of embodiments can be implemented. A particular implementation can have many modifications to the depicted environment based on the description provided herein.

With reference to FIG. 3, a block diagram of a data processing system is shown in which one or more aspects of the present invention can be implemented. Data processing system 300 is an example of a computer, such as server, or other type of device, in which computer usable program code or instructions implementing one or more processes may be located for the illustrative embodiments.

As shown in FIG. 3, data processing system 300 includes, for instance, a computer system 302 shown, e.g., in the form of a general-purpose computing device. Computer system 302 can include, but is not limited to, one or more processors or processing units 304 (e.g., central processing units (CPUs)), a memory 306 (referred to as main memory or storage, as examples), and one or more input/output (I/O) interfaces 308, coupled to one another via one or more buses and/or other connections 310.

Processor 304 includes a plurality of functional components used to execute instructions. These functional components include, for instance, an instruction fetch component to fetch instructions to be executed; an instruction decode unit to decode the fetched instructions and to obtain operands of the decoded instructions; instruction execution components to execute the decoded instructions; a memory access component to access memory for instruction execution, if necessary; and a write back component to provide the results of the executed instructions.

Bus 310 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 306 can include, for instance, a cache 320, such as a shared cache, which may be coupled to local caches 322 of processors 304. Further, memory 306 can include one or more programs or applications 330, an operating system 332, and one or more computer readable program instructions 334, including DNA sequencing instructions 336, DNA-related blockchain processing instructions 337, and blockchain ledger processing instructions 338, implementing one or more aspects disclosed herein. Additionally, or alternatively, computer readable program instructions 334 can be configured to carry out one or more other functions of certain embodiments of the invention.

Computer system 302 can also communicate via, e.g., I/O interfaces 308 with one or more external devices 340, one or more network interfaces 342, and/or one or more data storage devices 344. Example external devices include a user terminal, a tape drive, a pointing device, a display, etc. Network interface 342 enables computer system 302 to communicate with one or more networks, such as a local area network (LAN), a general wide area network (WAN), and/or a public network (e.g., the Internet), providing communication with other computing devices or systems.

Data storage device 344 can store one or more programs 346, one or more computer readable program instructions 348, and/or data, etc. The computer readable program instructions can be configured to carry out functions of one or more aspects of the present invention.

Computer system 302 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 302. Examples, include, but are not limited to: microcode, device drivers, redundant processing units, external disk drive arrays, RAID systems, tape drives, and data archival storage systems, etc.

Computer system 302 can be operational with numerous other general purpose or special purpose computing system environments or configurations. Examples of well-known computing systems, environments, and/or configurations suitable for use with computer system 302 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and cloud computing environments that include any of the above systems or devices, and the like.

Note again that the depicted example of FIG. 3 is not meant to imply architectural limitations. Further, as noted, data processing system 300 of FIG. 3 could be, for instance, a server, workstation, tablet computer, laptop computer, or other computing device.

As discussed, as part of, for instance, food product processing and distribution, the entities involved, including the supplier, can implement a management system which provides record data documenting, at least in part, a product's supply chain history. In one embodiment, a blockchain-enabled dynamic database can be implemented by a supplier and/or processor that tracks various aspects of a food product. As the final food product is readied, each component element, including sources, can be included as part of the record data for that food product, such as based on a unique product identifier (such as DNA-encoded data). When the product changes hands to a distributor, and to the final purchaser, the ownership record for the product can be updated accordingly, however, the underlying blockchain-based record data for the product is immutable, and offers a transparent way for suppliers, distributors and consumers to know with confidence the history of the food product. Similar confidence is engendered using blockchain technology in, for instance, securing a testator's will with, for instance, in one embodiment, assets being added to the will being included as part of the record data of the immutable blockchain for that will.

Figure 4:
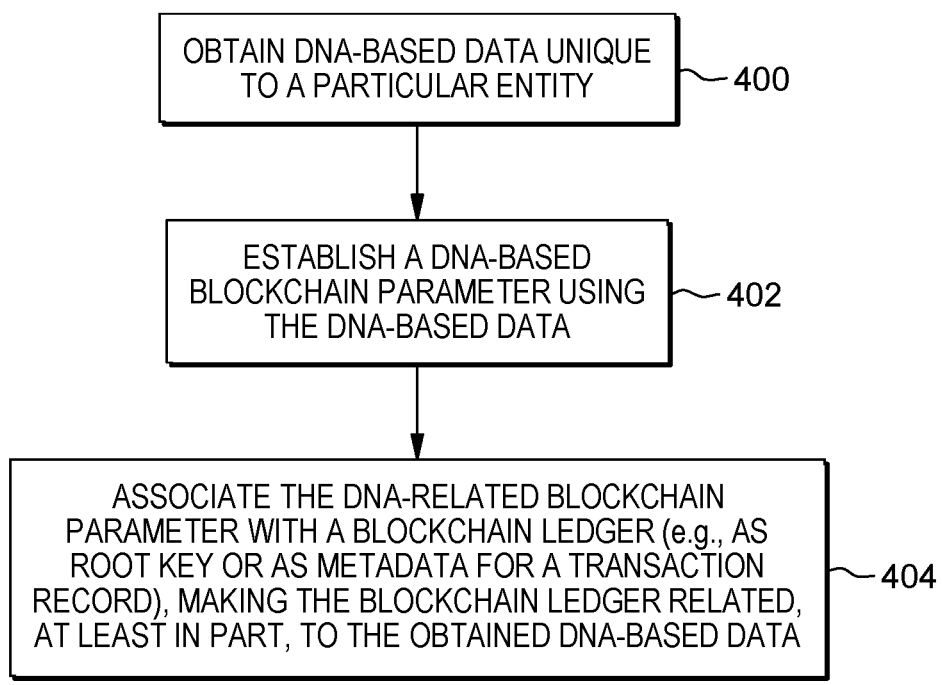
FIG. 4 depicts one embodiment of a workflow that illustrates certain aspects of an embodiment of the present invention.

As noted, in one or more aspects, enhancements to blockchain technology are provided herein by incorporating DNA-based data related to a particular product, will, document, etc., in the blockchain ledger. By way of example, FIG. 4 illustrates one embodiment of a workflow implementing certain aspects of some embodiments of the present invention. As illustrated, program code executing on one or more processors obtains DNA-based data unique to a particular entity to which a blockchain ledger is related 400. By way of example, the DNA-based data can be data provided based on a nucleotide chain obtained from a DNA sample unique to the particular entity. Program code executing on one or more processors establishes a DNA-related blockchain parameter using the DNA-based data 402. In one embodiment, the DNA-related blockchain parameter is a hash encoding parameter of a specified bit length, such as 256, 512, etc., based on the particular blockchain technology used (e.g., SHA-256, SHA-512, etc.). Program code associates the DNA-related blockchain parameter with the blockchain ledger 404. For instance, the DNA-related blockchain parameter can be used as a root key or, for instance, included as metadata for a transaction record, both of which make the blockchain related, at least in part, to the obtained DNA-based data.

Figure 5:
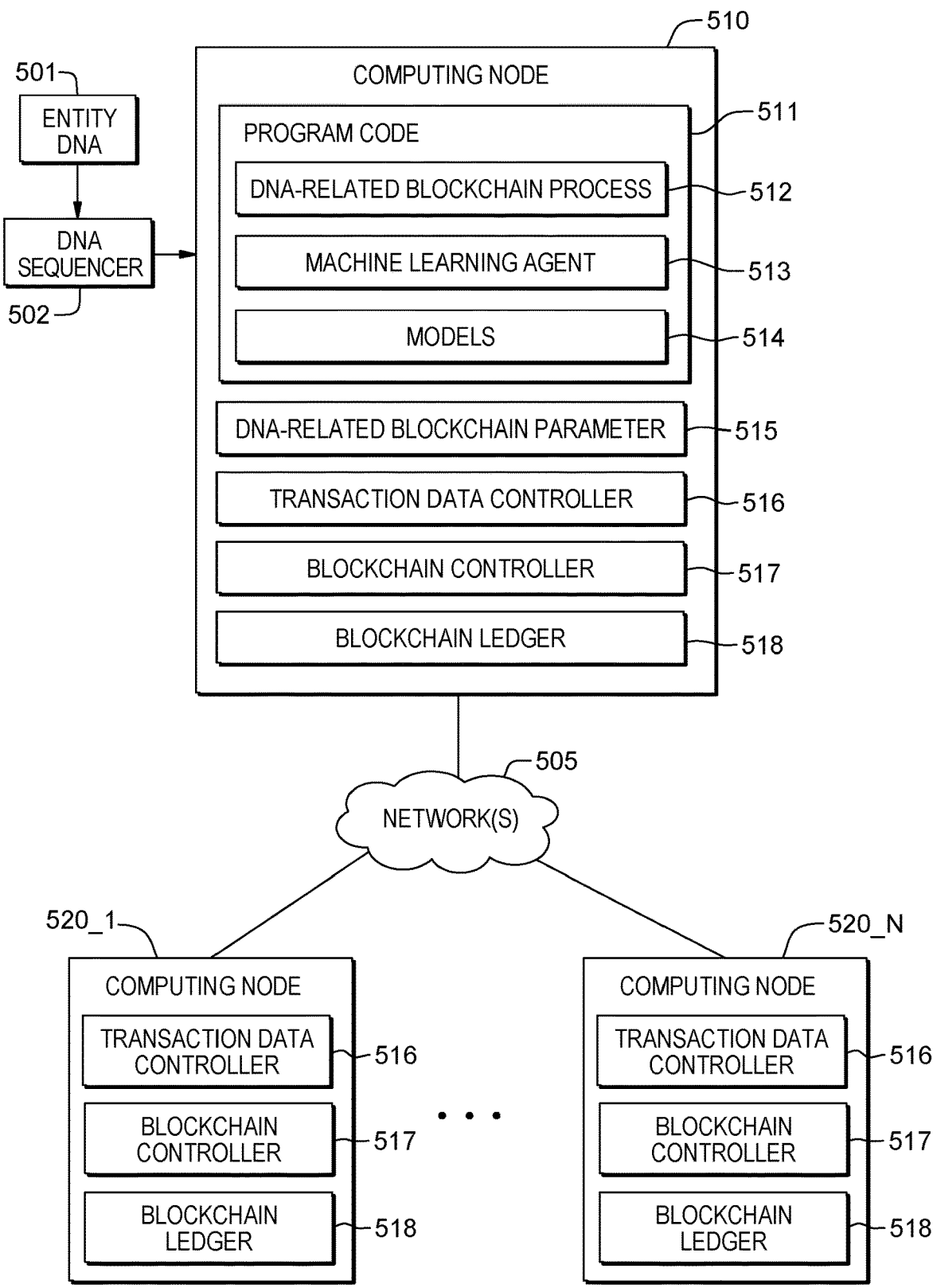
FIG. 5 depicts one embodiment of a system, illustrating certain aspects of an embodiment of the present invention.

By way of example, FIG. 5 depicts a system 500 illustrating, in part, one embodiment of a distributed computing platform on which a blockchain computational system (such as system 200 of FIG. 2) can be further enhanced with DNA-based encoding, such as disclosed herein. By way of example only, each computing node 510, 520_1 ... 520_N can be configured to include a transaction data controller 516, a blockchain controller 517, and a record database or blockchain database 518. In one embodiment, transaction data controller 516 manages transaction data including, but not limited to, receiving or otherwise obtaining transaction data (identification data, use data, etc.), and blockchain controller 517 manages blockchain computation including, but not limited to, accessing the transaction data and generating and validating a block, and adding the block to a blockchain. Record database 518 maintains a copy of the current version of the blockchain database, in one embodiment.

As illustrated in FIG. 5, in one embodiment, computing nodes 510, 520_1 ... 520_N, and a DNA sequencer 502 are operatively coupled in communication via one or more networks 505. Network(s) 505 can be, for instance, a telecommunications network, a local-area network (LAN), a wide-area network (WAN), such as the Internet, or combination thereof, and can include wired, wireless, fiber-optic connections, etc. The network(s) can include one or more wired and/or wireless networks that are capable of receiving and transmitting data, including transactions, record data, nucleotide chain data, and other DNA-related data, such as described herein.

In one embodiment, computing nodes 510, 520_1 ... 520_N, can each include one or more processors, for instance, central processing units (CPUs). Also, the respective processor(s) can include functional components used in the integration of program code, such as functional components to fetch program code from locations such as cache or main memory, decode program code, and execute program code, access memory for instructions, and write results of the executed instructions or code. The processor(s) can also include a register(s) to be used by one or more of the functional components. In one or more embodiments, the computing resource(s) can include memory, input/output, a network interface, and storage, which can include and/or access one or more other computing resources and/or databases, as required to implement the inventive aspects described herein. The components of the respective computing resource(s) can be coupled to each other via one or more buses and/or other connections. Bus connections can be one or more of any of several types of bus structures, including a memory bus or a memory controller, a peripheral bus, an accelerated graphics port, and a processor or a local bus, using any of a variety of architectures. By way of example, and not limitation, such architectures can include the Industry Standard Architecture (ISA), the Micro-Channel Architecture (MCA), the Enhanced ISA (EISA), the Video Electronic Standard Association (VESA), local bus, and Peripheral Component Interconnect (PCI). Examples of a computing node or computer system which can implement one or more aspects disclosed herein are described further herein with reference to FIGS. 3, 10 & 11. Note also that, depending on the implementation, one or more aspects of each computing node can be associated with, licensed by, subscribed to by, etc., a company or organization, such as a company or organization supplying, processing, distributing, etc., a product at issue.

As shown, the distributed computing platform can include one or more DNA sequencers 502 that are operatively coupled to a computing node 510 of a plurality of computing nodes 510, 520_1 . . . 520_N operatively coupled across communications network(s) 505. DNA sequencer 502 receives a DNA sample 501 of an entity, such as an individual (in the case of a will) or a livestock entity, produce entity, seed entity, etc. (in the case of a food supply implementation), and determines therefrom the nucleic acid sequence, or order of nucleotides, in the DNA. Rapid DNA sequencing methods and processing are available to assist with the sequencing. Note that although shown as a separate DNA sequencer 502, DNA sequencing processing can be included as part of one or more of computing nodes 510, 520_1 . . . 520_N, in one or more other implementations.

By way of example, cluster analysis is one of the more commonly used methods of machine learning, and can be used in evaluating a DNA sequence. For instance, cluster analysis clusters DNA sequences with similar characteristics into a cluster, and then analyzes biological sequence functions. Further, genetic sequences of DNA that are unique to an individual can be identified. A variety of sequencing approaches are available in the art including, for instance, single-molecule real-time sequencing, ion semiconductor sequencing, sequencing by synthesis, combinatorial probe anchor synthesis sequencing, sequencing by ligation, nanopore sequencing, etc. In one embodiment, a DNA sequencer 502 provides a nucleotide chain sequence to computing node 510.

In one embodiment, computing node 510 includes program code 511 executing on the computing node to provide DNA-related blockchain processing 512 (such as disclosed herein), which can include a machine learning agent 513 and model(s) 514. Program code 511 generates, in one implementation, a DNA-related blockchain parameter 515, which is then linked into the blockchain record by associating or integrating the parameter with the blockchain record, such as disclosed herein.

As illustrated, one or more aspects of one or more embodiments of blockchain processing with DNA-related blockchain parameters such as disclosed herein can utilize artificial intelligence (AI), including machine learning. For instance, one or more aspects of DNA sequencing can utilize machine learning, as can obtaining DNA-based data unique to a particular entity, in accordance with the concepts disclosed herein.

Figure 6:
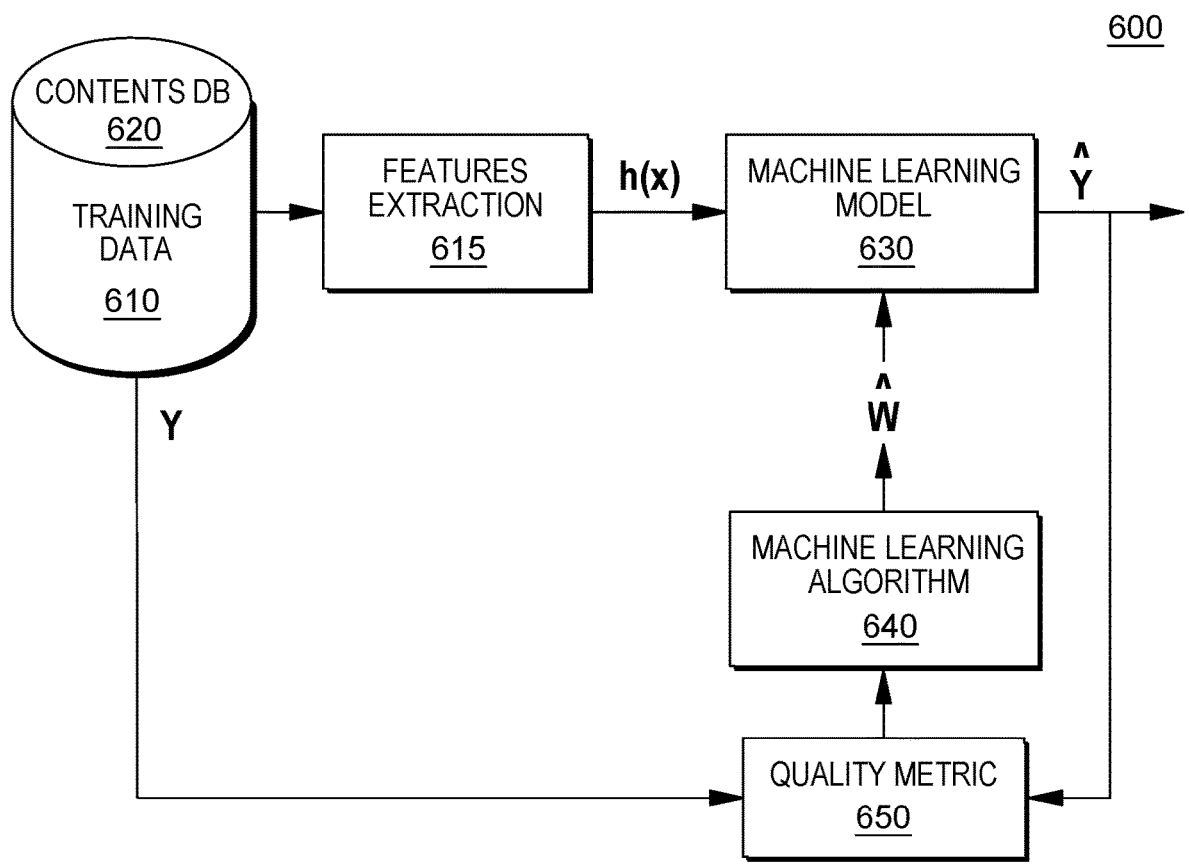
FIG. 6 illustrates various aspects of some embodiments of the present invention.

FIG. 6 is an example machine learning training system 600 that can be utilized to perform machine learning, such as described herein. Training data 610 used to train the model in embodiments of the present invention can include a variety of types of data, such as data generated by various data sources and/or computing nodes of the system. Program code, in embodiments of the present invention, can perform machine learning analysis to generate data structures, including modules or algorithms used by the program code to perform one or more aspects disclosed herein, including generating DNA-related data for association with a blockchain, as well as verifying whether there is a DNA relationship above a set threshold between other DNA-based data and an extracted DNA-related blockchain parameter, such as disclosed herein. Machine learning (ML) solves problems that cannot be solved by numerical means alone. In this ML-based example, program code extracts various features/attributes from training data 610, which can be stored in memory or one or more databases 620. The extracted features 615 are utilized to develop a predictor function, h(x), also referred to as a hypothesis, which the program code utilizes as a machine learning model 630. In identifying machine learning model 630, various techniques can be used to select features (elements, patterns, attributes, etc.), including but not limited to, diffusion mapping, principle component analysis, recursive feature elimination (a brute force approach to selecting features), and/or a random forest, to select the attributes related to the verified review data, record data, and/or a particular recommendation. Program code can utilize a machine learning algorithm 640 to train machine learning model 630 (e.g., the algorithms utilized by the program code), including providing weights for conclusions or recommendations, so that the program code can train any predictor or performance functions included in the machine learning model 640, such as whether a particular component of a product relates to the verified review data being analyzed. The conclusions can be evaluated by a quality metric 650. By selecting a diverse set of training data 610, the program code trains the machine learning model(s) 640 to identify and weight various attributes (e.g., features, patterns) that correlate to enhanced performance of the machine learning agent implemented by the computing node. The model(s) 514 (FIG. 5) used by machine learning agent 513 can be self-learning, as program code updates the model based on additional record data obtained. For instance, in some embodiments of the present invention, the program code executing on the computing node(s) can utilize existing machine learning analysis tools or agents to create, and tune, each respective model.

Some embodiments of the present invention can utilize IBM Watsonx as learning agent. IBM Watson® is a register trademark of International Business Machines Corporation, Armonk, New York, USA. In embodiments of the present invention, the respective program code can interface with IBM Watson® application programing interfaces (APIs) to perform machine learning analysis of obtained data. In some embodiments of the present invention, the respective program code can interface with the application programming interfaces (APIs) that are part of a known machine learning agent, such as the IBM Watson® application programming interface (API), a product of International Business Machines Corporation, to determine impacts of data on an operational model, and to update the respective model, accordingly.

In some embodiments of the present invention, certain of the APIs of the IBM Watson® API include a machine learning agent (e.g., learning agent) that includes one or more programs including, but not limited to, natural language classifiers, Retrieve-and-Rank (i.e., a service available through IBM Watson® developer cloud that can surface the most relevant information from document data), concepts/visualization insights, trade-off analytics, document conversion, natural language processing, and/or relationship extraction. In an embodiment of the present invention, one or more programs can be provided to analyze data obtained by the program code across various sources utilizing one or more of, for instance, a natural language classifier, Retrieve-and-Rank APIs, and trade-off analytics APIs. In operation, the program code can collect and save machine-learned data used by the machine-learning agent.

In some embodiments of the present invention, the program code utilizes a neural network to identify and collect data, and analyze collected data, such as unique DNA-related data, to generate one or more models used by the processing. This learning is referred to as deep learning, which is a set of techniques for learning in neural networks. Neural networks, including modular neural networks, are capable of pattern (e.g., state) recognition with speed, accuracy, and efficiency, in situations where data sets are multiple and expansive, including across a distributed network, including but not limited to, cloud computing systems. Modern neural networks are non-linear statistical data modeling tools. They are usually used to model complex relationships between inputs and outputs, or to identify patterns (e.g., states) in data (i.e., neural networks are non-linear statistical data modeling or decision making tools). In general, program code utilizing neural networks can model complex relationships between inputs and outputs and identified patterns of data. Because of the speed and efficiency of neural networks, especially when parsing multiple complex data sets, neural networks and deep learning provide solutions to many problems in multi-source processing, which the programming code, in embodiments of the present invention, can accomplish to facilitate providing, for instance, a DNA-related blockchain parameter for association with a blockchain ledger to make the blockchain ledger related, at least in part, to obtained DNA-related data, as disclosed herein.

Figure 7A:
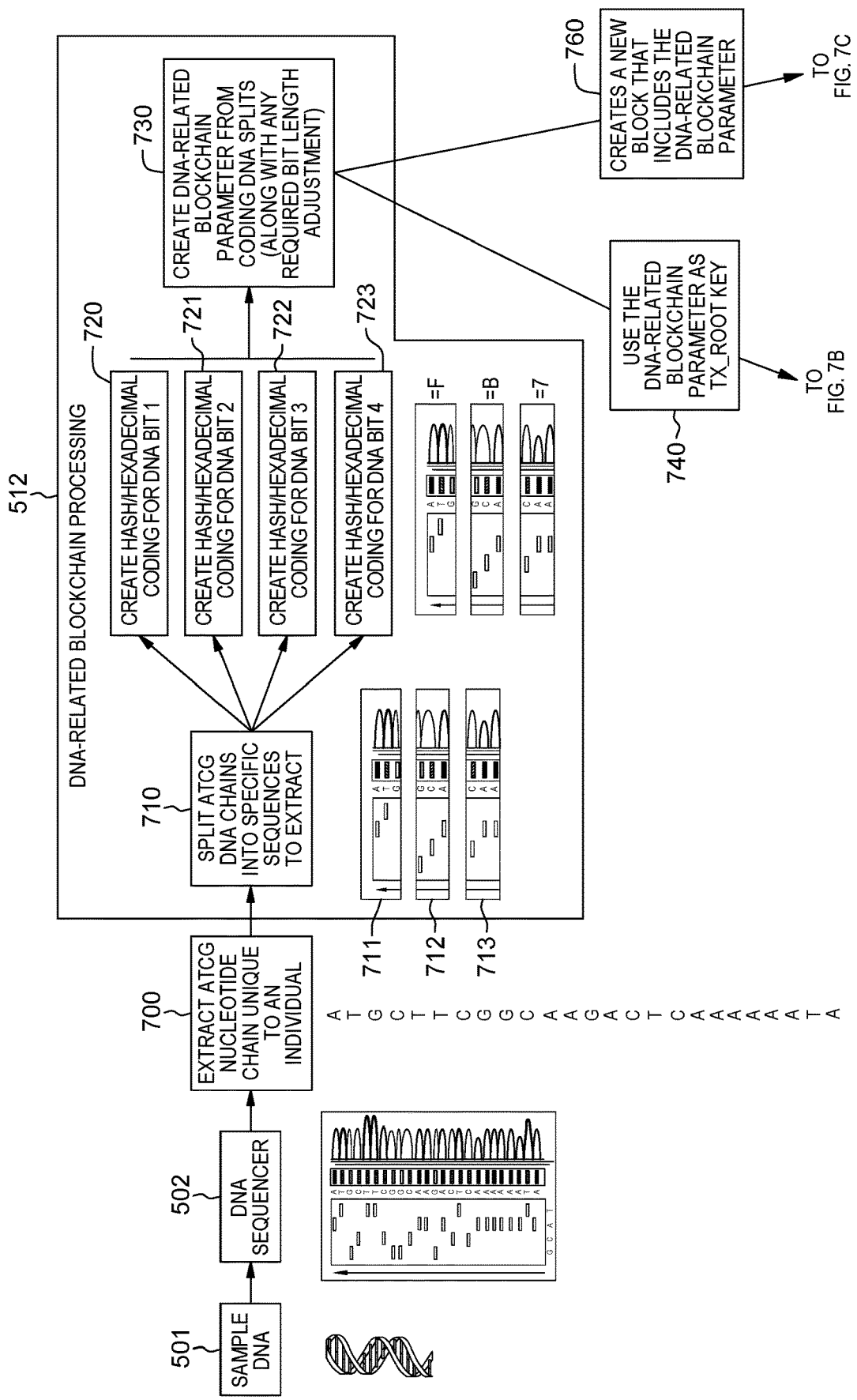
FIG. 7A illustrates one embodiment of a workflow illustrating certain aspects of some embodiments of the present invention.
Figure 7B:
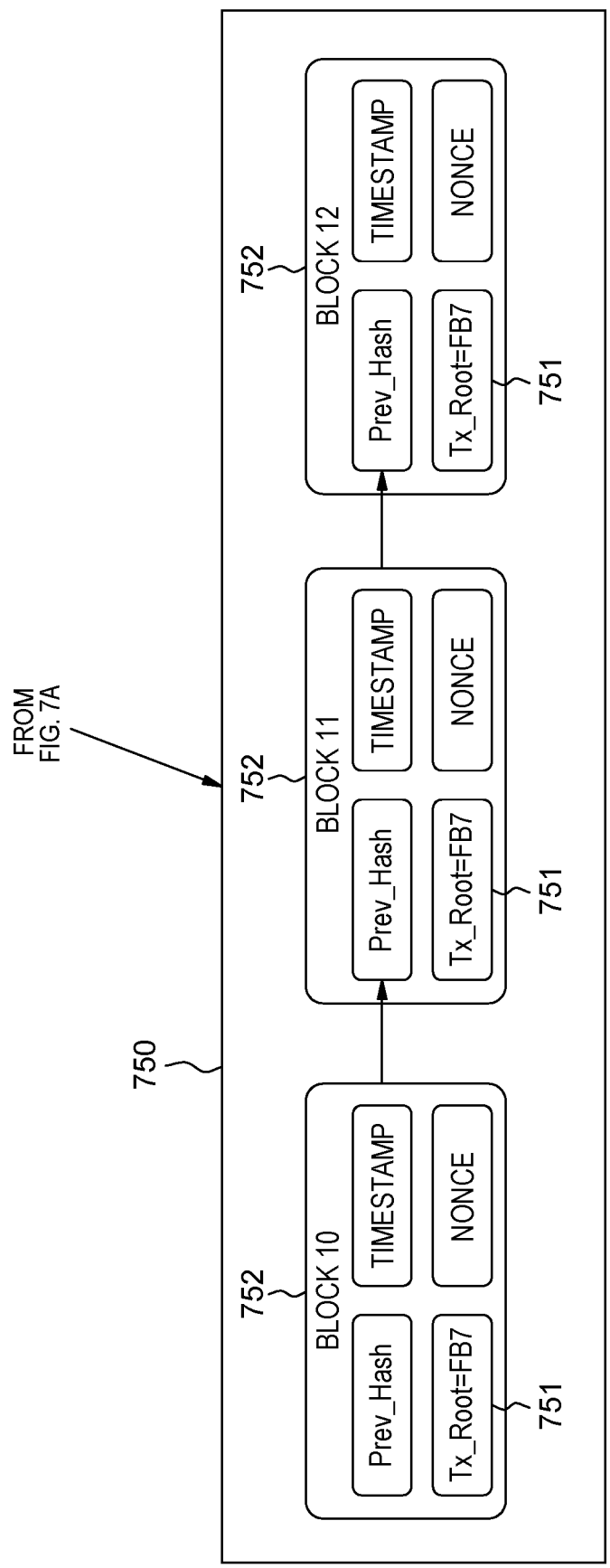
FIG. 7B illustrates another embodiment of a workflow that illustrates certain aspects of some embodiments of the present invention.
Figure 7C:
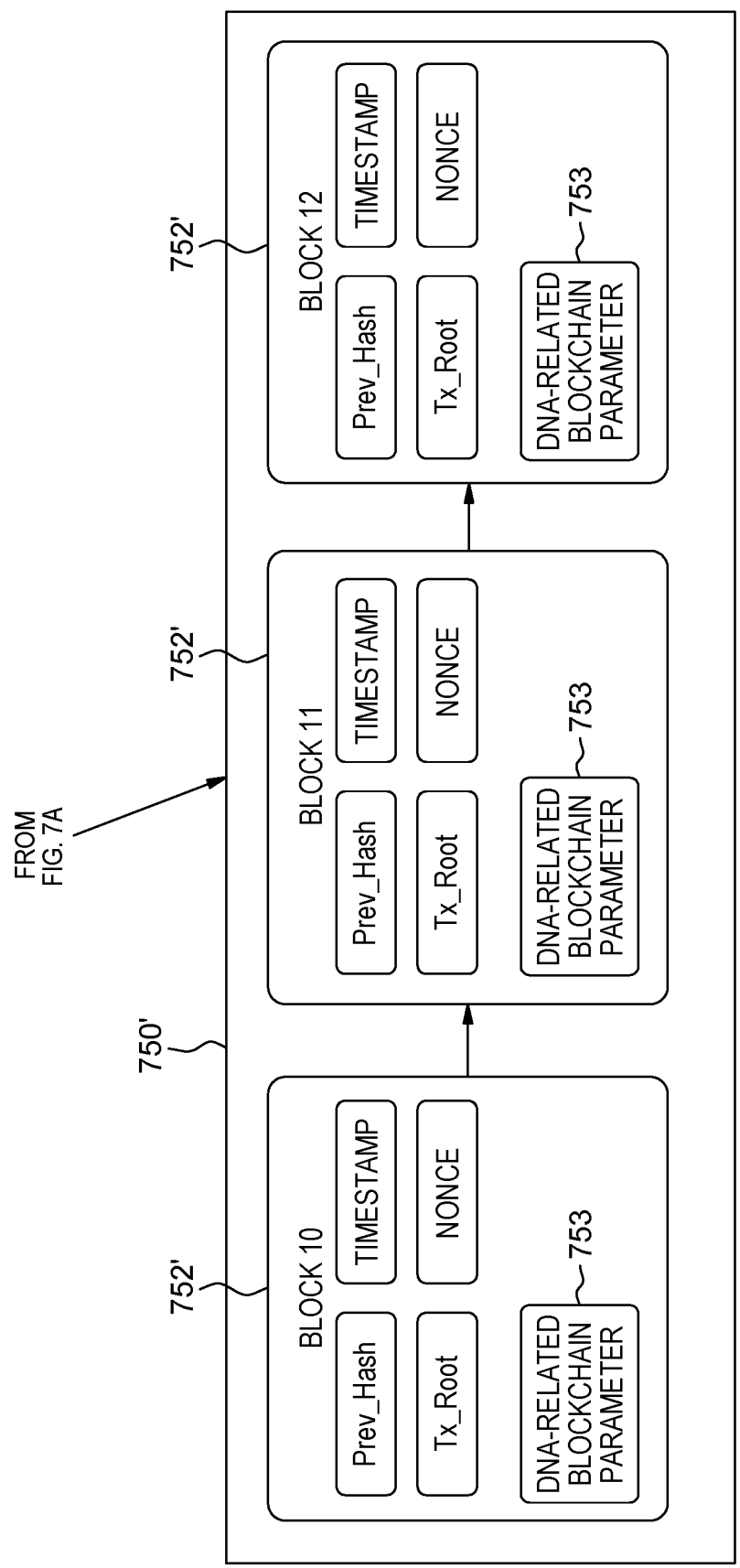
FIG. 7C illustrates a further embodiment of a workflow that illustrates certain aspects of some embodiments of the present invention.

FIGS. 7A-7C illustrate embodiments of different workflows illustrating further aspects of some embodiments of the present invention.

Referring to FIG. 7A, sample DNA 501 is obtained from a particular entity, such as a particular food item in a food supply chain example, or a testator in the will example described herein. The sample DNA for the particular entity is provided to a DNA sequencer 502, which extracts one or more ATCG nucleotide chain sequences or sections unique to the particular entity 700. The extracted nucleotide chain section(s) or sequence(s) unique to the particular entity can each be a section of the overall nucleotide chain of the entity. The nucleotide chain section(s) is provided to DNA-related blockchain processing 512 which, in one embodiment, splits or separates the nucleotide chain section(s) into a series of discrete nucleotide sequences 711, 712, 713, etc. A numeral system, such as an alphanumeric system, is used to convert the series of nucleotide sequences into an integer string, such as series of alphanumeric integers 720, 721, 722, 723, etc. For instance, in the example of FIG. 7A, nucleotide sequence 711 is assigned alphanumeric integer F, nucleotide sequence 712 is assigned alphanumeric value B, and nucleotide sequence 713 is assigned alphanumeric value 7, by way of example only. The result is a string of integers, or DNA-based data, that is correlated to the particular entity's DNA sample. A DNA-related blockchain parameter is then created from the integer string, along with any required bit length adjustments 730.

In one or more embodiments, the string of integers can be expanded into the DNA-related blockchain parameter, and in particular, to a specified bit length for use of the DNA-related blockchain parameter as a key, using data obtained from the integer string itself. For instance, in one embodiment, the expanding includes ascertaining a prime number in the integer string, such as the first-encountered prime number (of a desired size), and applying the ascertained prime number to the integer string to obtain the DNA-related blockchain parameter of the specified bit length. In one example, applying the prime number can include recursively multiplying the integer string by the ascertained prime number until reaching the specified bit length for the DNA-related blockchain parameter.

FIGS. 7B & 7C depict different embodiments for associating a DNA-related blockchain parameter with a blockchain ledger, in order to make the blockchain ledger related, at least in part, to the obtained DNA-based data.

Referring to FIG. 7B, in this example, the DNA-related blockchain parameter is used as the root key (TX_Root) for the blockchain ledger, thereby syncing transactions of the blockchain ledger to the DNA encoding of the entity. In particular, as shown in FIG. 7B, the DNA-related blockchain parameter is used as the TX_Root key 751 for the transaction ledger 740 as represented by TX_Root=FB7 in individual blocks 752 of blockchain ledger 750. In essence, the DNA-related blockchain parameter is used in this example as a salt key or seed at the start of the blockchain. In this manner, the DNA-related blockchain parameter is associated with every transaction record of the blockchain ledger.

FIG. 7C depicts an alternate embodiment of associating the DNA-related blockchain parameter with a blockchain ledger. In this embodiment, a block 10 is created that includes the DNA-related blockchain parameter 753 as, for instance, metadata associated with a payload for that block. In this example, the blockchain ledger 750' is shown to include multiple blocks 752', each with the incorporated DNA-related blockchain parameter 753 as part of the block data, based on its inclusion in block 10.

Figure 8A:
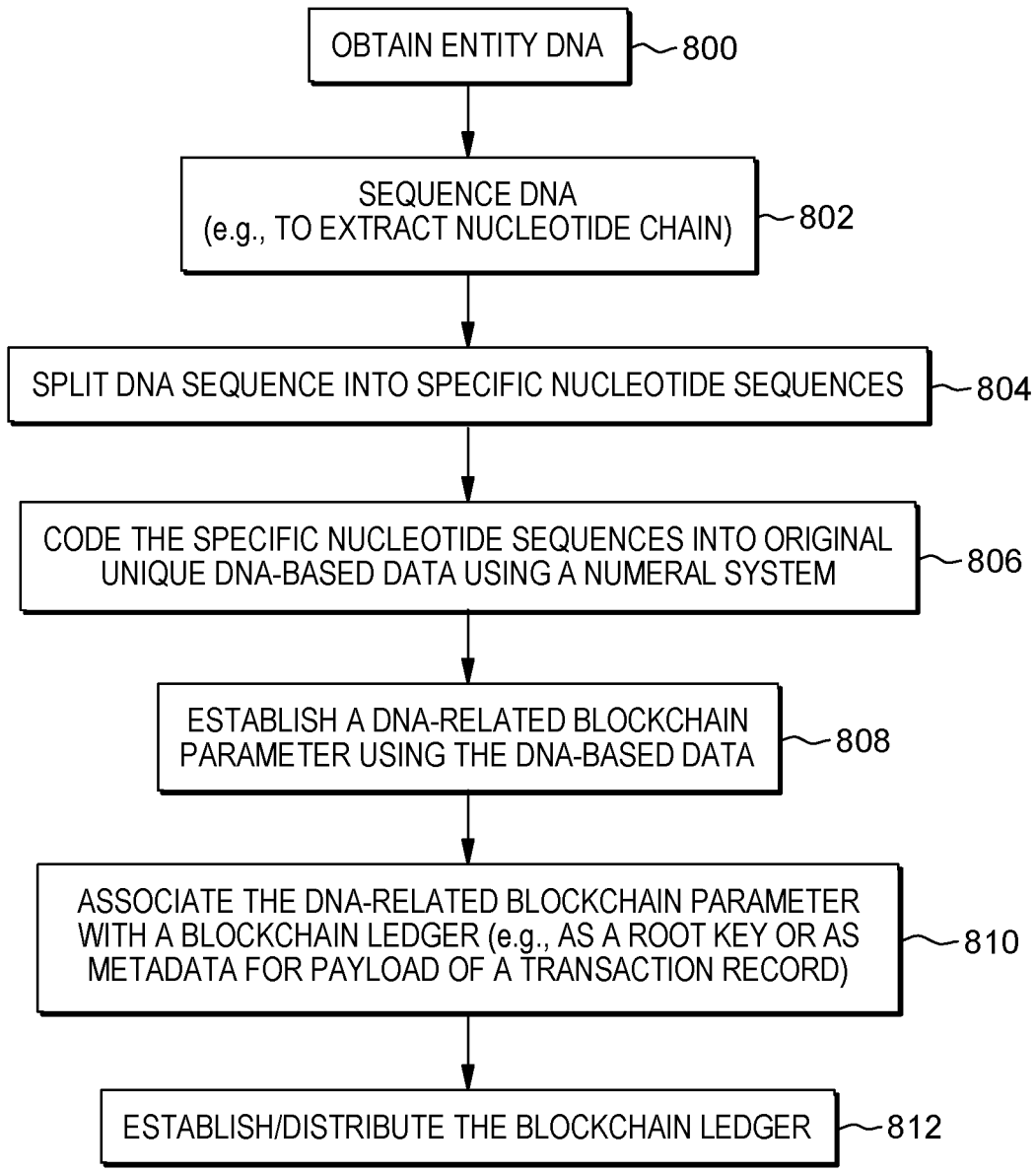
FIGS. 8A-8B depict further embodiments of workflows that illustrates certain aspects of some embodiments of the present invention.
Figure 8B:
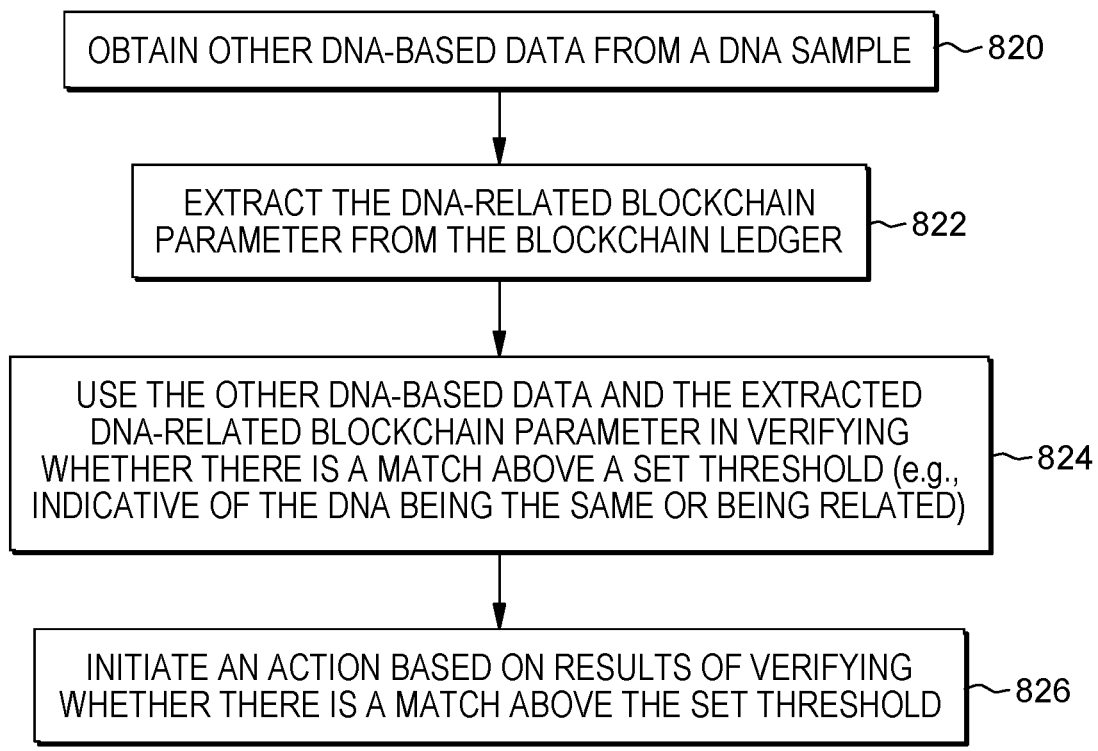

FIGS. 8A & 8B depict one embodiment of a workflow illustrating certain aspects of an embodiment of the present invention.

Referring to FIG. 8A, in one embodiment, a process such as disclosed herein includes obtaining an entity's DNA 800. Depending on the application, the entity can be an individual (as in the case of a will) or other biological entity, such as food stock (in the case of a food supply chain). The obtained DNA sample is sequenced to extract unique nucleotide data, such as a nucleotide chain section unique to the entity 802. The DNA chain sequence is split into multiple nucleotide sequences to obtain a series of nucleotide sequences 804. Specific nucleotide sequences are then encoded into unique DNA-based data using a numeral system 806, such as an alphanumeric numeral system or numeric numeral system, where specific nucleotide sequences are assigned different integer values in order to obtain a string of integers representative of the series of nucleotide sequences.

A DNA-related blockchain parameter is established using the DNA-based data 808. In one embodiment, the DNA-related blockchain parameter is a blockchain hash encoding parameter of a specified bit length for a particular blockchain encoding being used. Where the integer string of the DNA-based data is less than the specified bit length, then the DNA-related blockchain parameter can be established, in one embodiment, by ascertaining a prime number in the integer string, and applying the ascertained prime number to the string of integers to expand the integer string and obtain the DNA-related blockchain parameter of specified bit length. For instance, in one embodiment, applying the prime number can include recursively multiplying the integer string by the ascertained prime number until reaching the specified bit length for the DNA-related blockchain parameter. In one specific example, the prime number ascertained can be a first prime number appearing in the string of integers.

The DNA-related blockchain parameter is then associated with the blockchain ledger 810. For instance, in the embodiment of FIG. 7B, the DNA-related blockchain parameter is used as root key for the blockchain ledger, making the blockchain ledger related, at least in part, to the obtained DNA-based data. In the embodiment of FIG. 7C, the DNA-related blockchain parameter is associated with the blockchain ledger as part of a new block, such as part of a payload, or more particularly, as metadata associated with a payload for the block or transaction record. The blockchain ledger is then established and/or distributed, with the DNA-related blockchain parameter being part of the blockchain ledger 812 for subsequent DNA-based verification.

FIG. 8B depicts a further workflow embodiment that illustrates certain aspects of some embodiments of the present invention. In this workflow, other DNA-based data is obtained from a DNA sample 820. For instance, in the case of a food supply chain implementation, the DNA-based data can be from the same entity as originally providing the DNA (e.g., the same livestock), or a different entity. In the case of the will application, the DNA-based data might be from an offspring of the testator providing the original DNA same from which the original DNA-based data is obtained.

The DNA-related blockchain parameter is extracted from the blockchain ledger 822 by reversing the blockchain process used for incorporating the DNA-related blockchain parameter. The other DNA-based data and the extracted DNA-related blockchain parameter are then used to verify whether there is a match above a set threshold 824. In one embodiment, the threshold can be set to be indicative that the DNA samples being considered are the same, or are related (as in the case of an offspring). Note that there are a number of approaches for verifying whether there is a match using the other DNA-based data and the extracted DNA-related blockchain parameter. For instance, the other DNA-based data can be used to generate another DNA-related blockchain parameter, which is then compared against the extracted DNA-related blockchain parameter. In another embodiment, the extracted DNA-related blockchain parameter can be reversed to obtain the original DNA-based data, which can then be compared to the other DNA-based data to verify whether there is a match above the set threshold. Note that the set threshold can be any accepted industry standard for verifying that two DNA samples match, or that one sample is obtained from an offspring of an entity providing the other sample.

An action can then be initiated by the processing based on the results of verifying whether there is a match above the set threshold 826. For instance, in the case of a will application, the applicable assets can be distributed to the offspring upon verifying that there is a match, or in the case of a smart contract, the contract can be executed or validated upon verifying there is a DNA match. In the case of a food supply chain application, an indication can be provided that the livestock at issue is an offspring of the original livestock from whose DNA the DNA-related blockchain parameter was generated, as described herein.

One or more aspects of the present invention are inextricably tied to computer technology, and in particular, to blockchain technology within a computing environment. Further details of one or more aspects related to enhancing blockchain technology within a computing environment are described below with reference to FIGS. 9A-9B.

Figure 9A:
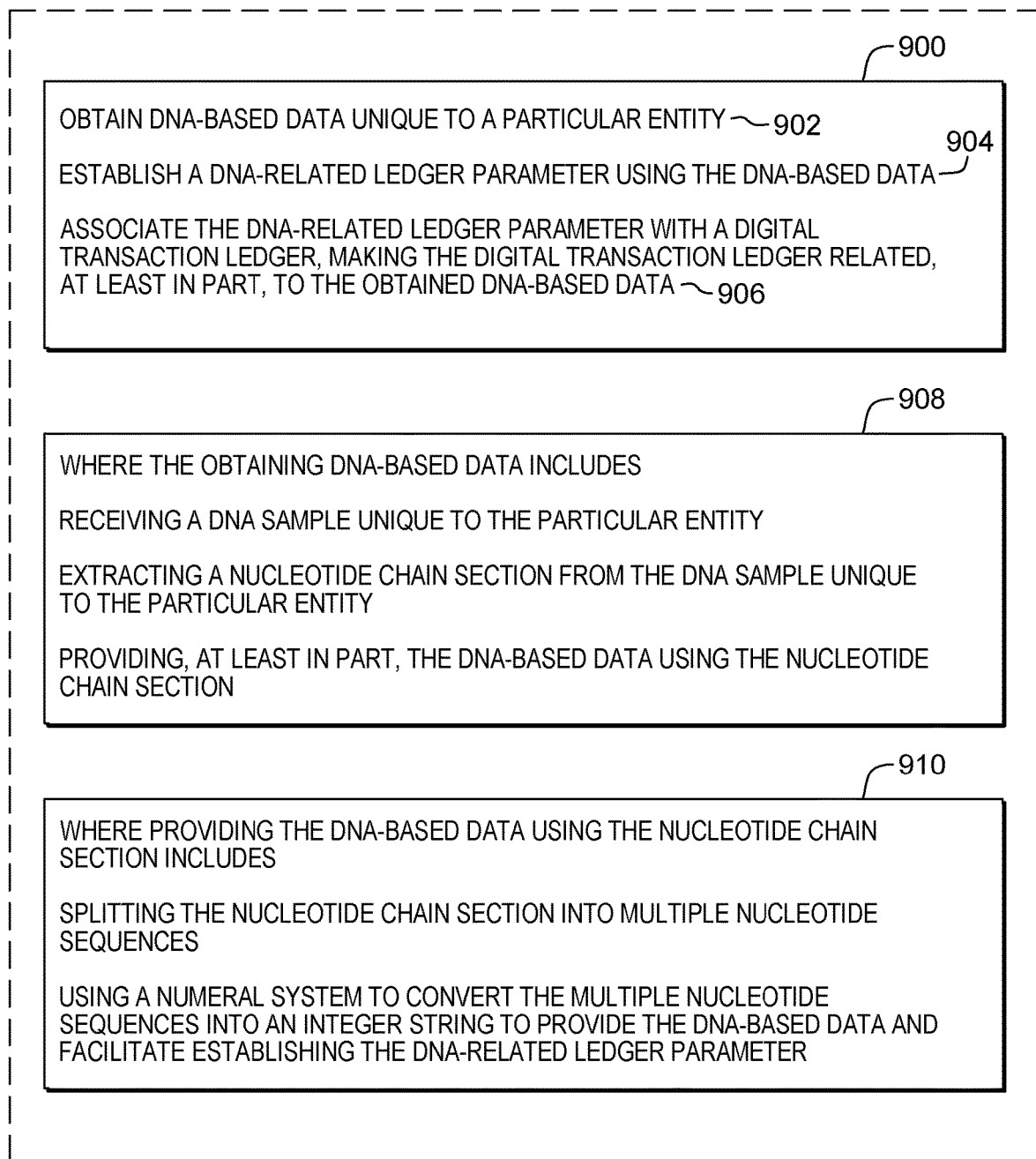

Referring to FIG. 9A, in one embodiment, a computer-implemented method 900 is provided, which includes obtaining DNA-based data unique to a particular entity 902, and establishing a DNA-related ledger parameter (such as a DNA-related blockchain parameter) using the DNA-based data 904. Further, the method includes associating the DNA-related ledger parameter with a digital transaction ledger (such as a blockchain ledger, or other ledger noted herein), making the digital transaction ledger related, at least in part, to the obtained DNA-based data 906.

By making the digital transaction ledger related, at least in part, to the obtained DNA-based data, digital ledger technology is enhanced by linking DNA-based data encoding to the ledger. Linking a DNA profile to a digital transaction ledger advantageously provides immutable proof of identity, and can be used to execute one or more DNA-related transactions along the transaction ledger. In this manner, authenticity is guaranteed through the blockchain ledger and the associated DNA encoding. In one or more implementations, the DNA encoding is used as a unique key in the digital transaction ledger, and is a personalized key to a particular entity for use in the ledger.

In one embodiment, obtaining the DNA-based data includes receiving a DNA sample unique to the particular entity, extracting a nucleotide chain section from the DNA sample unique to the particular entity, and providing, at least in part, the DNA-based data using the nucleotide chain section 908. By providing the DNA-based data using a nucleotide chain section unique to a particular entity, the DNA-related ledger parameter established for the DNA-based data is tied to the particular entity's DNA, thereby establishing a unique identifier correlated to a specific DNA nucleotide chain.

In one implementation, providing the DNA-based data using the nucleotide chain section includes splitting the nucleotide chain section into multiple nucleotide sequences, and using a numeral system to convert the multiple nucleotide sequences into an integer string to provide the DNA-based data and facilitate establishing the DNA-related ledger parameter 910. Advantageously, the integer string is established unique to the nucleotide chain section.

Referring to FIG. 9B, in one embodiment, establishing the DNA-related ledger parameter includes expanding the DNA-based data to a specified bit length for the DNA-related ledger parameter to facilitate associating the DNA-related ledger parameter with the digital transaction ledger 912. For instance, in one embodiment, 256 or 512 encoding can be used, where the DNA-related ledger parameter is a hash parameter or key of the desired bit length.

In one implementation, expanding the DNA-related data includes ascertaining a prime number in the string of integers, and applying the ascertained prime number to the integer string to obtain the DNA-related ledger parameter of the specified bit length 914. For instance, in one embodiment, applying the prime number includes recursively multiplying the integer string by the ascertained prime number until reaching the specified bit length for the DNA-related ledger parameter 916. In this manner, data within the integer string itself uniquely generated from the nucleotide chain section is used to generate the more complex DNA-related ledger parameter of the desired bit size. A DNA-related ledger parameter is established for linking to the digital transaction ledger, which is related to the DNA-based data only, thereby tying (or linking) the digital transaction ledger to the DNA-based data.

In one embodiment, associating the DNA-related ledger parameter with the digital transaction ledger includes using the DNA-related ledger parameter as a root key for the digital transaction ledger, thereby making the transaction ledger related, at least in part, to the obtained DNA-based data 918. By using the DNA-related ledger parameter as root key for the digital transaction ledger, transaction records of the ledger are advantageously synced or linked to the particular entity's DNA-based data.

In one embodiment, associating the DNA-related ledger parameter with a digital transaction ledger includes including the DNA-related ledger parameter with a transaction record of the digital transaction ledger, thereby making the transaction ledger related, at least in part, to the obtained DNA-based data 920. For instance, in one embodiment, the DNA-related ledger parameter can be provided as metadata for a payload of a transaction record, thereby linking the digital transaction ledger, at least in part, to the DNA-related data.

In one embodiment, associating the DNA-related ledger parameter with a transaction ledger syncs transaction records of the ledger to the DNA-related ledger parameter, thereby relating the transaction records of the ledger to the obtained DNA-based data 924. Advantageously, by syncing transaction records of the digital transaction ledger to the DNA-related ledger parameter, a genetic association is provided which can be traced forwards or backwards through the digital transaction ledger.

In one embodiment, the method further includes a DNA verification method 926 which includes obtaining other DNA-based data from a DNA sample 928, and extracting the DNA-related ledger parameter from the digital transaction ledger 930. The other DNA-based data and the extracted DNA-related ledger parameter are then used in verifying whether there is a DNA relationship above a set threshold between the other DNA-based data and the extracted DNA-related ledger parameter 932. Based on results of verifying whether there is a DNA relationship above the set threshold, an action is initiated 934. For instance, the DNA-based data and the extracted DNA-related ledger parameter can be used to determine whether the DNA is from the same entity, or whether the other DNA-based data is from an offspring of the particular entity from which the DNA-based data was obtained and used in establishing the DNA-related ledger parameter extracted from the ledger. By linking DNA-based data encoding to the digital transaction ledger, immutable proof of an identity relation can thus be established from which an action can be taken, depending on the application. This allows for genetic-based verification in association with digital transaction ledger technology, and initiating of one or more actions based on the genetic-based verification.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node can include a computer system/server such as the one depicted in FIG. 3. Computer system/server 302 of FIG. 3 can be practiced and distributed in cloud computing environments where tasks are performed by remote processing devices that are linked through a communications network. In a distributed cloud computing environment, program modules can be located in both local and remote computer system storage media, including memory storage devices. Computer system/server 302 is capable of being implemented to perform the functionality set forth herein.

Figure 10:
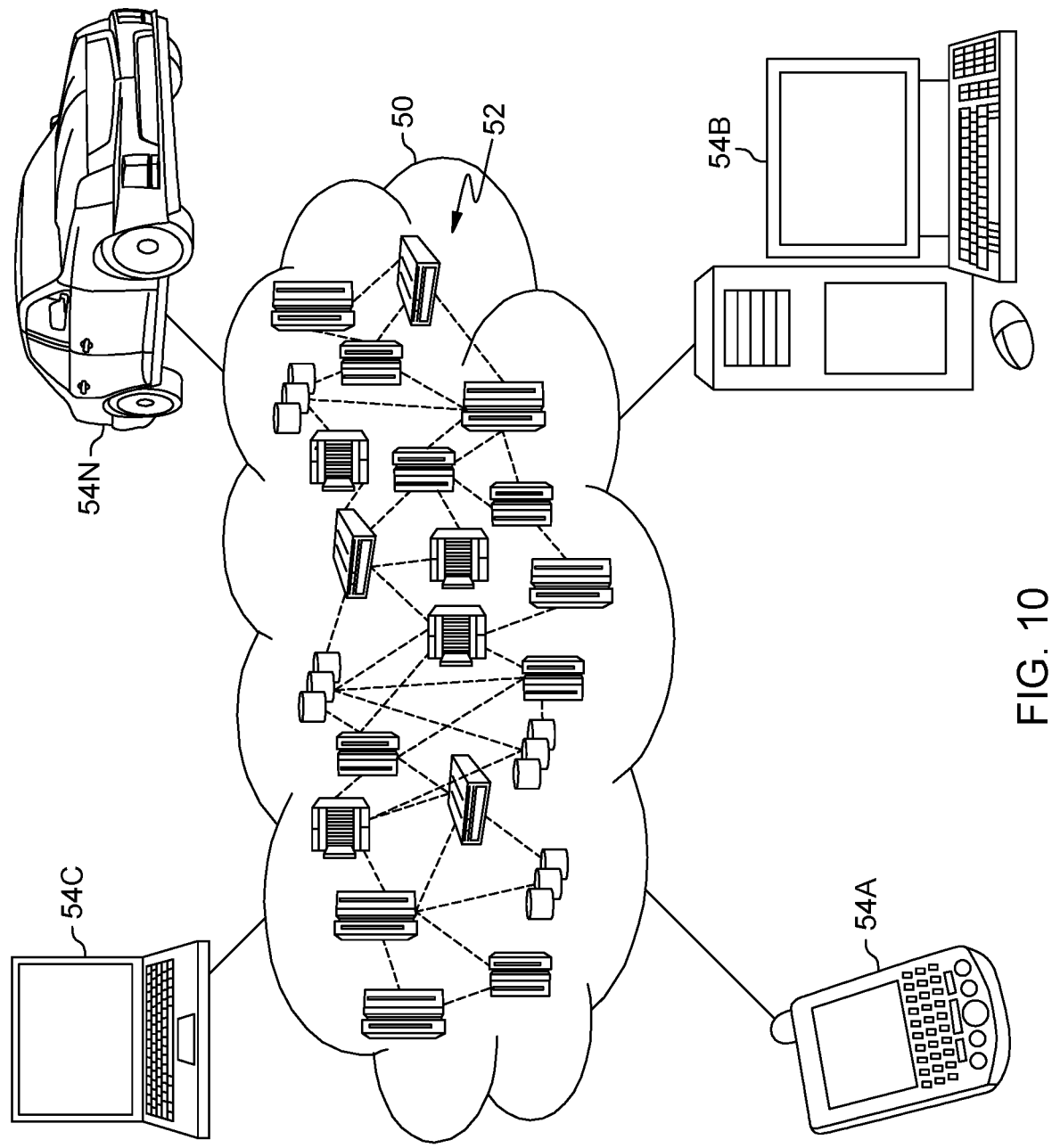
FIG. 10 depicts an embodiment of a cloud computing environment which can facilitate implementing, or be used in association with, certain aspects of an embodiment of the present invention.

Referring now to FIG. 10, illustrative cloud computing environment 50 is depicted. As shown, cloud computing environment 50 comprises one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 52 and cloud computing environment 50 can communicate with any type of computerized device over any type of network and/or network addressable connection (e.g., using a web browser).

Figure 11:
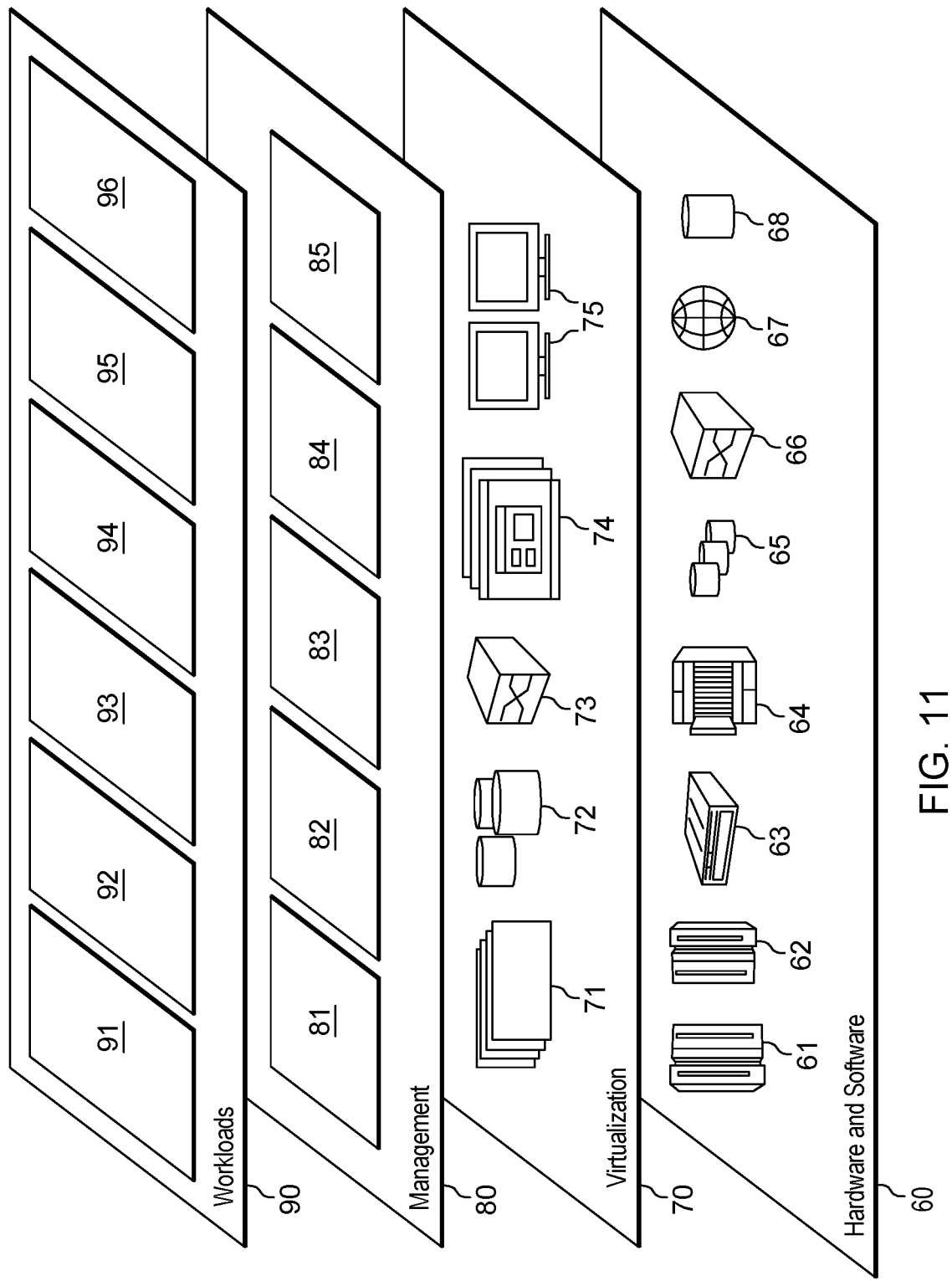
FIG. 11 depicts abstraction model layers according to an embodiment of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided.

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and DNA-related blockchain processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It is noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other types of devices and/or tracking components may be used in one or more embodiments. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer-implemented method comprising:
obtaining DNA-based data unique to a particular entity, the obtaining comprising:
using a DNA sequencer to extract an ATCG nucleotide chain section from a DNA sample unique to the particular entity;
splitting the ATCG nucleotide chain section into multiple distinct nucleotide base sequences, each nucleotide base sequence comprising a unique sequence of nucleotide bases in the ATCG nucleotide chain section; and
encoding each nucleotide base sequence of the multiple distinct nucleotide base sequences with a different numerical value, and providing the numerical values as a string unique to the ATCG nucleotide chain section based on location of the multiple distinct nucleotide base sequences in the ATCG nucleotide chain section, the DNA-based data including the string unique to the ATCG nucleotide chain section;
generating a digital DNA-related ledger parameter using the DNA-based data including the string unique to the ATCG nucleotide chain section; and
integrating the digital DNA-related ledger parameter into a digital transaction ledger, linking the digital transaction ledger, at least in part, to the DNA-based data to facilitate executing a DNA-related transaction along the digital transaction ledger.

2. The computer-implemented method of claim 1, wherein generating the digital DNA-related ledger parameter comprises expanding the DNA-based data to a specified bit length for the digital DNA-related ledger parameter to facilitate associating the digital DNA-related ledger parameter with the digital transaction ledger.

3. The computer-implemented method of claim 2, wherein the expanding comprises ascertaining a first-encountered prime number in the string of a desired size, and applying the ascertained prime number to the string to obtain the digital DNA-related ledger parameter of the specified bit length.

4. The computer-implemented method of claim 3, wherein applying the prime number comprises recursively multiplying the string by the ascertained prime number until reaching the specified bit length for the digital DNA-related ledger parameter.

5. The computer-implemented method of claim 1, wherein the integrating comprises using the digital DNA-related ledger parameter as a root key for the digital transaction ledger, thereby linking the digital transaction ledger, at least in part, to the DNA-based data.

6. The computer-implemented method of claim 1, wherein the integrating comprises including the digital DNA-related ledger parameter with a transaction record of the digital transaction ledger, thereby linking the digital transaction ledger, at least in part, to the DNA-based data.

7. The computer-implemented method of claim 1, wherein the integrating syncs transaction records of the digital transaction ledger to the digital DNA-related ledger parameter, thereby relating the transaction records of the digital transaction ledger to the obtained DNA-based data.

8. The computer-implemented method of claim 1, further comprising:
obtaining other DNA-based data from a DNA sample;
extracting the digital DNA-related ledger parameter from the digital transaction ledger;
using the other DNA-based data and the extracted digital DNA-related ledger parameter in verifying whether there is a DNA relationship above a set threshold between the other DNA-based data and the extracted digital DNA-related ledger parameter; and
initiating an action based on verifying that the DNA relationship is above the set threshold.

9. A system comprising:
a memory;
one or more processors in communication with the memory; and
program instructions executable by the one or more processors via the memory to perform a method comprising:
obtaining DNA-based data unique to a particular entity, the obtaining comprising:

using a DNA sequencer to extract an ATCG nucleotide chain section from a DNA sample unique to the particular entity;

splitting the ATCG nucleotide chain section into multiple distinct nucleotide base sequences, each nucleotide base sequence comprising a unique sequence of nucleotide bases in the ATCG nucleotide chain section; and encoding each nucleotide base sequence of the multiple distinct nucleotide base sequences with a different numerical value, and providing the numerical values as a string unique to the ATCG nucleotide chain section based on location of the multiple distinct nucleotide base sequences in the ATCG nucleotide chain section, the DNA-based data including the string unique to the ATCG nucleotide chain section;

generating a digital DNA-related ledger parameter using the DNA-based data including the string unique to the ATCG nucleotide chain section; and integrating the digital DNA-related ledger parameter into a digital transaction ledger, linking the digital transaction ledger at least in part, to the DNA-based data to facilitate executing a DNA-related transaction along the digital transaction ledger.

10. The system of claim 9, wherein generating the digital DNA-related ledger parameter comprises expanding the DNA-based data unique to the nucleotide chain section to a specified bit length for the digital DNA-related ledger parameter to facilitate associating the digital DNA-related ledger parameter with the digital transaction ledger, and wherein the expanding comprises ascertaining a first encountered prime number in the string of a desired size, and applying the ascertained prime number to the string to obtain the digital DNA-related ledger parameter of the specified bit length.

11. The system of claim 9, wherein the integrating comprises using the digital DNA-related ledger parameter as a root key for the digital transaction ledger, thereby linking the digital transaction ledger, at least in part, to the DNA-based data.

12. The system of claim 9, wherein the integrating comprises including the digital DNA-related ledger parameter with a transaction record of the digital transaction ledger, thereby linking the digital transaction ledger, at least in part, to the obtained DNA-based data.

13. The system of claim 9, further comprising:
obtaining other DNA-based data from a DNA sample;
extracting the digital DNA-related ledger parameter from the digital transaction ledger;
using the other DNA-based data and the extracted digital DNA-related ledger parameter in verifying whether there is a DNA relationship above a set threshold between the other DNA-based data and the extracted digital DNA-related ledger parameter; and
initiating an action based on verifying that the DNA relationship is above the set threshold.

14. A computer program product comprising:
a computer-readable storage medium having computer-readable code embodied therein, the computer-readable code being executable by one or more processors to cause the one or more processors to:
obtain DNA-based data unique to a particular entity, the obtaining comprising:
using a DNA sequencer to extract an ATCG nucleotide chain section from a DNA sample unique to the particular entity;
splitting the ATCG nucleotide chain section into multiple distinct nucleotide base sequences, each nucleotide base sequence comprising a unique sequence of nucleotide bases in the ATCG nucleotide chain section; and
encoding each nucleotide base sequence of the multiple distinct nucleotide base sequences with a different numerical value, and providing the numerical values as a string unique to the ATCG nucleotide chain section based on location of the multiple distinct nucleotide base sequences in the ATCG nucleotide chain section, the DNA-based data including the string unique to the ATCG nucleotide chain section;
generating a digital DNA-related ledger parameter using the DNA-based data including the string unique to the ATCG nucleotide chain section; and
integrate the digital DNA-related ledger parameter into a digital transaction ledger, linking the digital transaction ledger, at least in part, to the DNA-based data to facilitate executing a DNA-related transaction along the digital transaction ledger.

15. The computer program product of claim 14, wherein the integrating comprises using the digital DNA-related ledger parameter as a root key for the digital transaction ledger, thereby linking the digital transaction ledger, at least in part, to the obtained DNA-based data.

16. The computer program product of claim 14, wherein the integrating comprises including the digital DNA-related ledger parameter with a transaction record of the digital transaction ledger, thereby linking the digital transaction ledger, at least in part, to the obtained DNA-based data.

17. The computer program product of claim 14, wherein the computer-readable code is executed by the one or more processors to further cause the one or more processors to:
obtain other DNA-based data from a DNA sample;
extract the digital DNA-related ledger parameter from the digital transaction ledger;
use the other DNA-based data and the extracted digital DNA-related ledger parameter in verifying whether there is a DNA relationship above a set threshold between the other DNA-based data and the extracted digital DNA-related ledger parameter; and
initiate an action based on verifying that the DNA relationship is above the set threshold.

* * * * *